(No Model.)  
13 Sheets—Sheet 1.
H. A. J. RIECKERT.
HARVESTER.
No. 429,959.  Patented June 10, 1890.
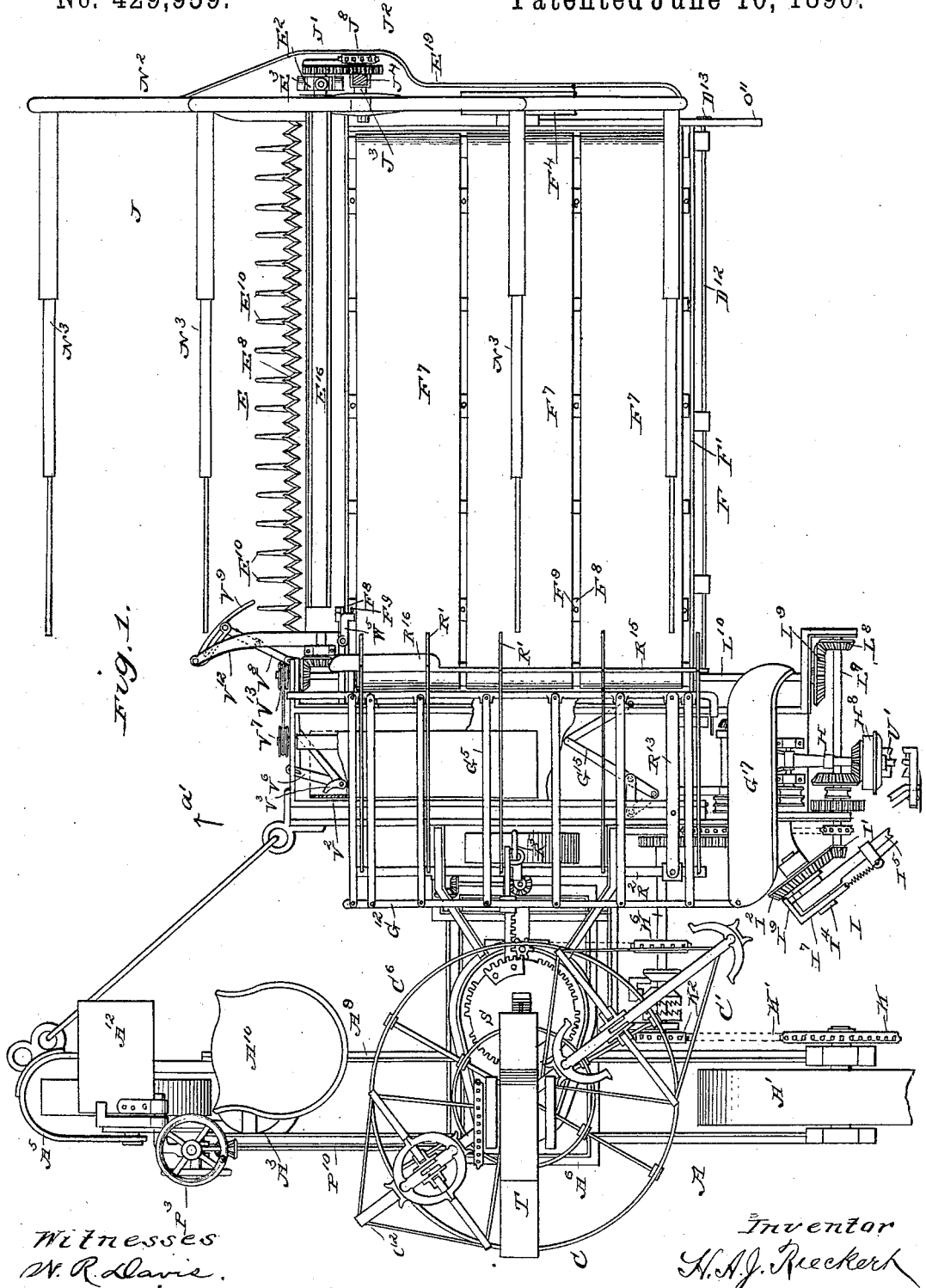
Witnesses  
N. R. Davis.  
C. Sedgwick
Inventor  
H. A. J. Rieckert  
By Munn & Co  
Attorneys

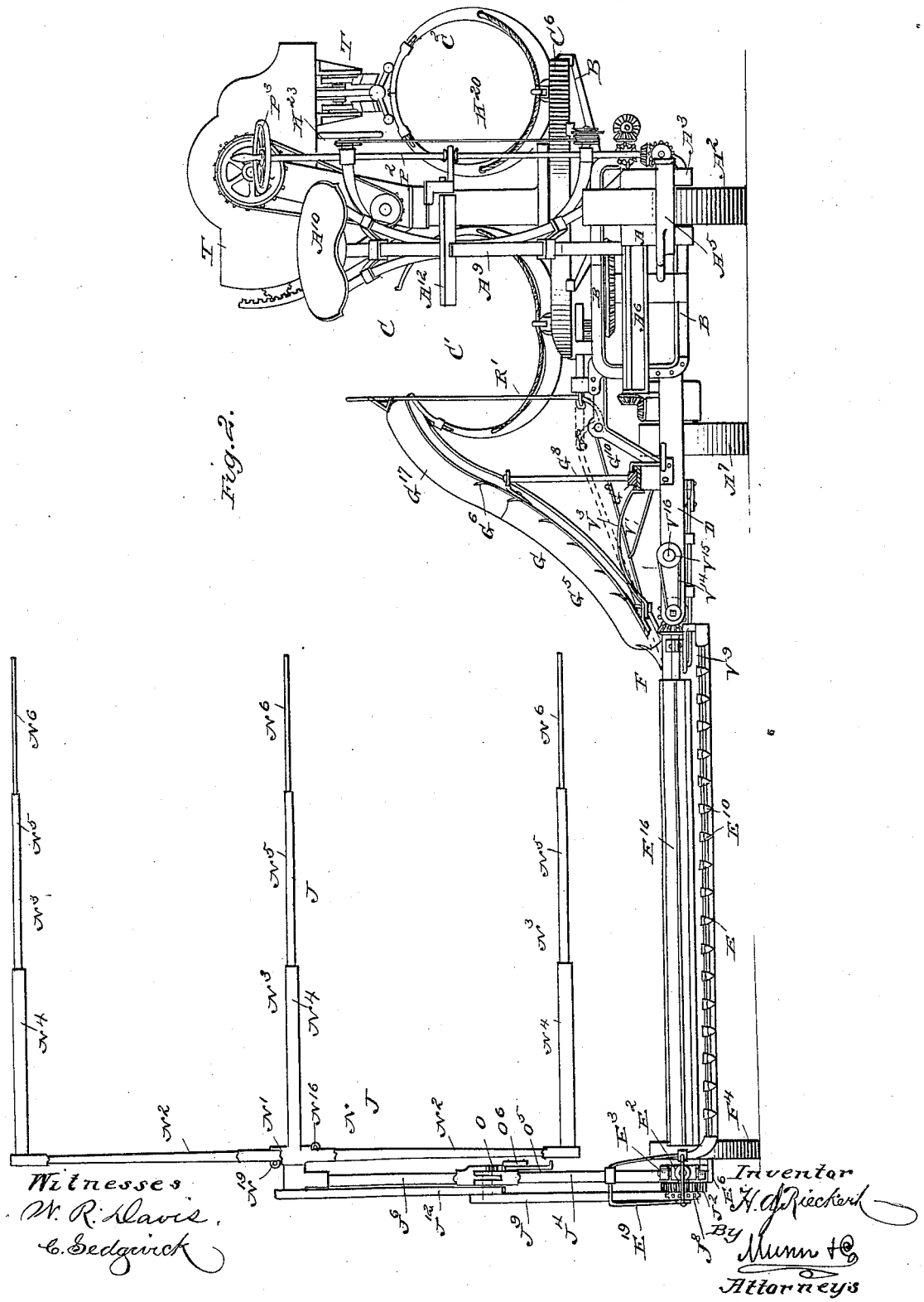

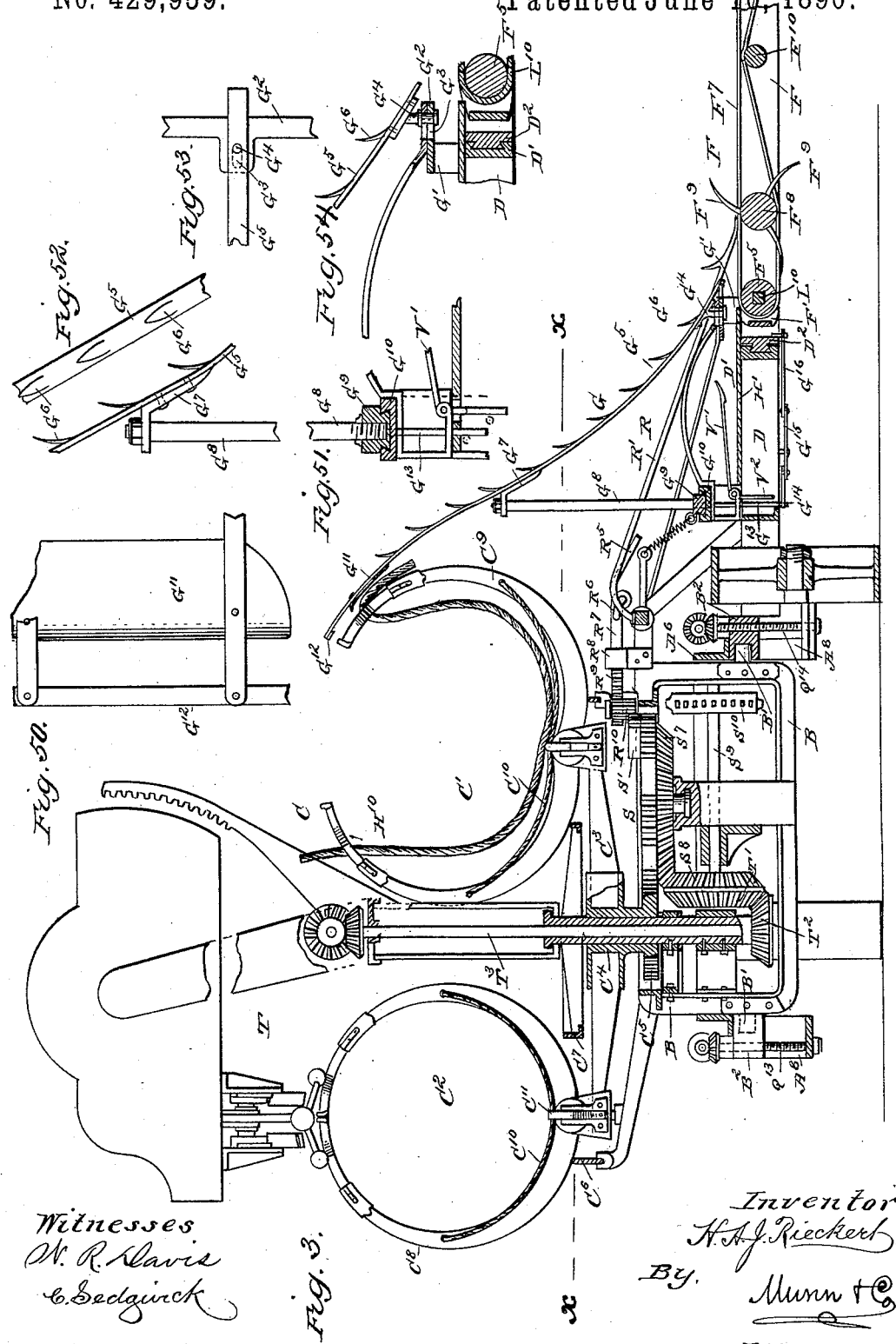

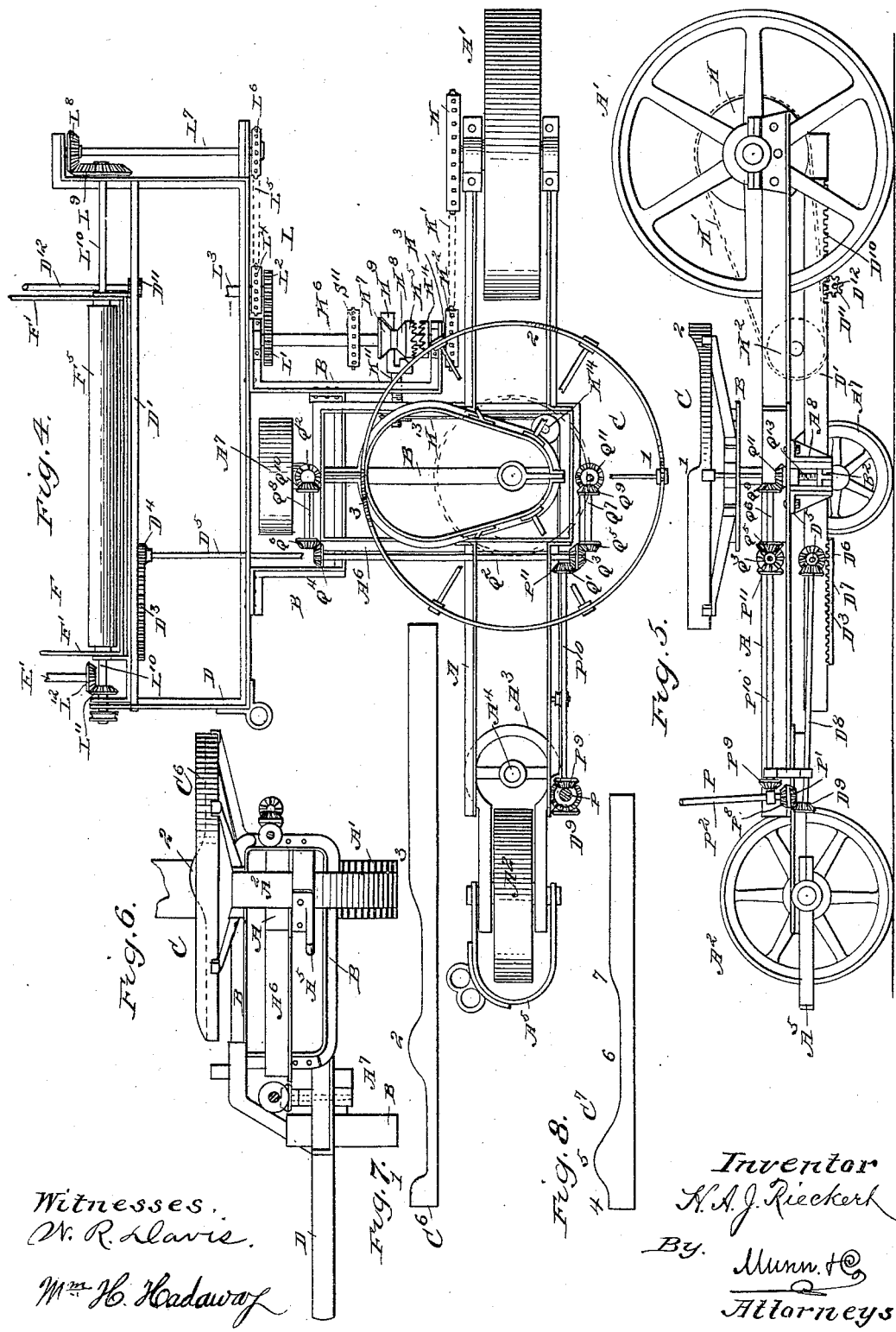

(No Model.) 13 Sheets—Sheet 5.
H. A. J. RIECKERT.
HARVESTER.
No. 429,959. Patented June 10, 1890.
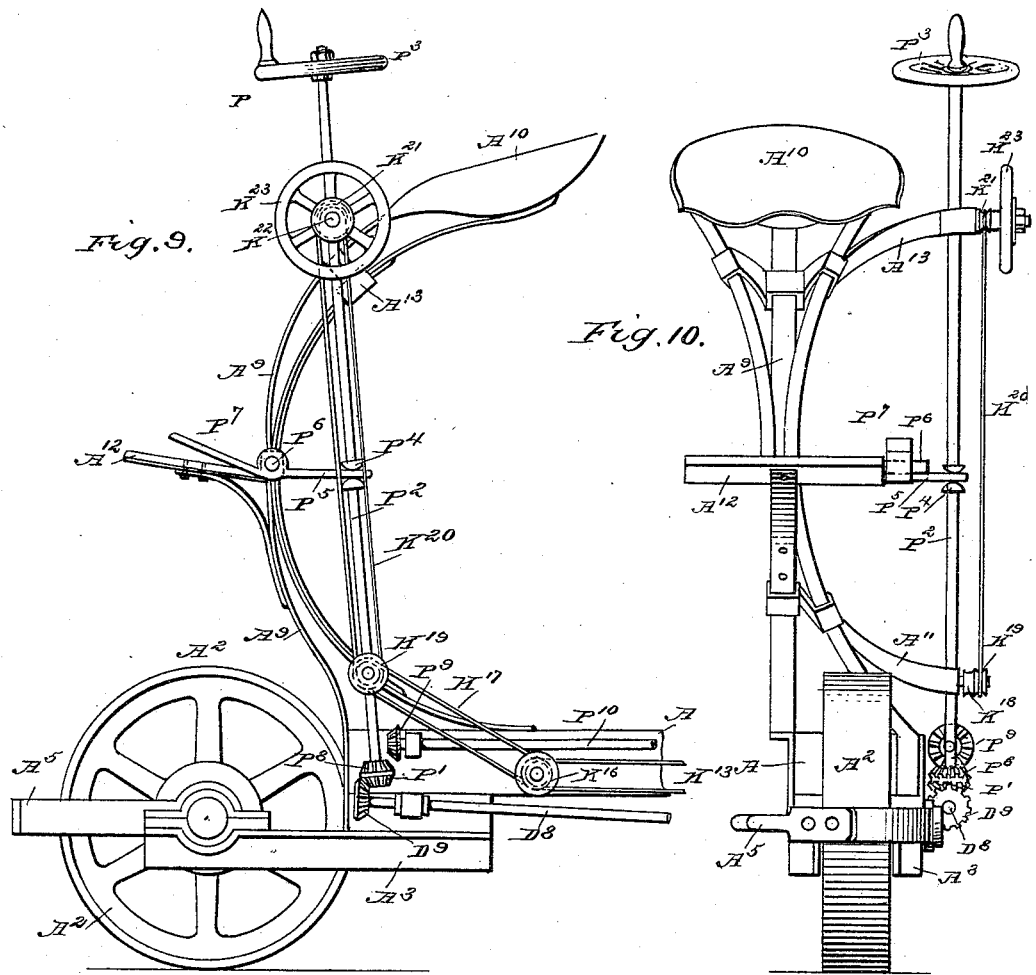
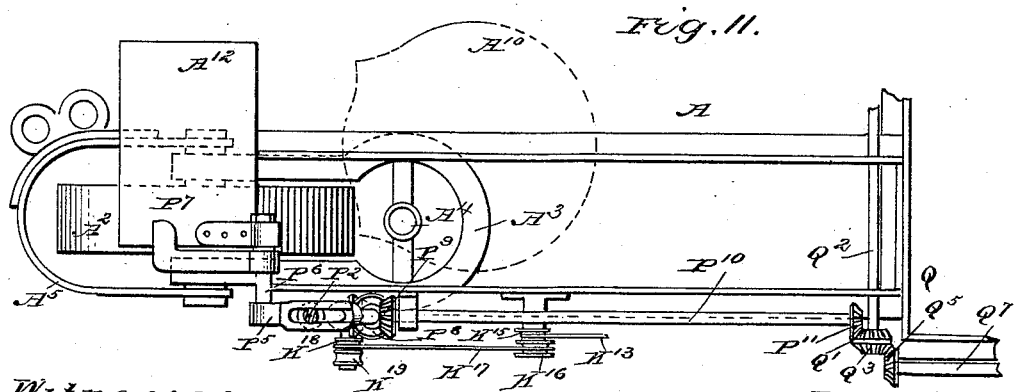
Witnesses
W. R. Davis
C. Sedgwick
Inventor
H. A. J. Rieckert
By Munn & Co
Attorneys

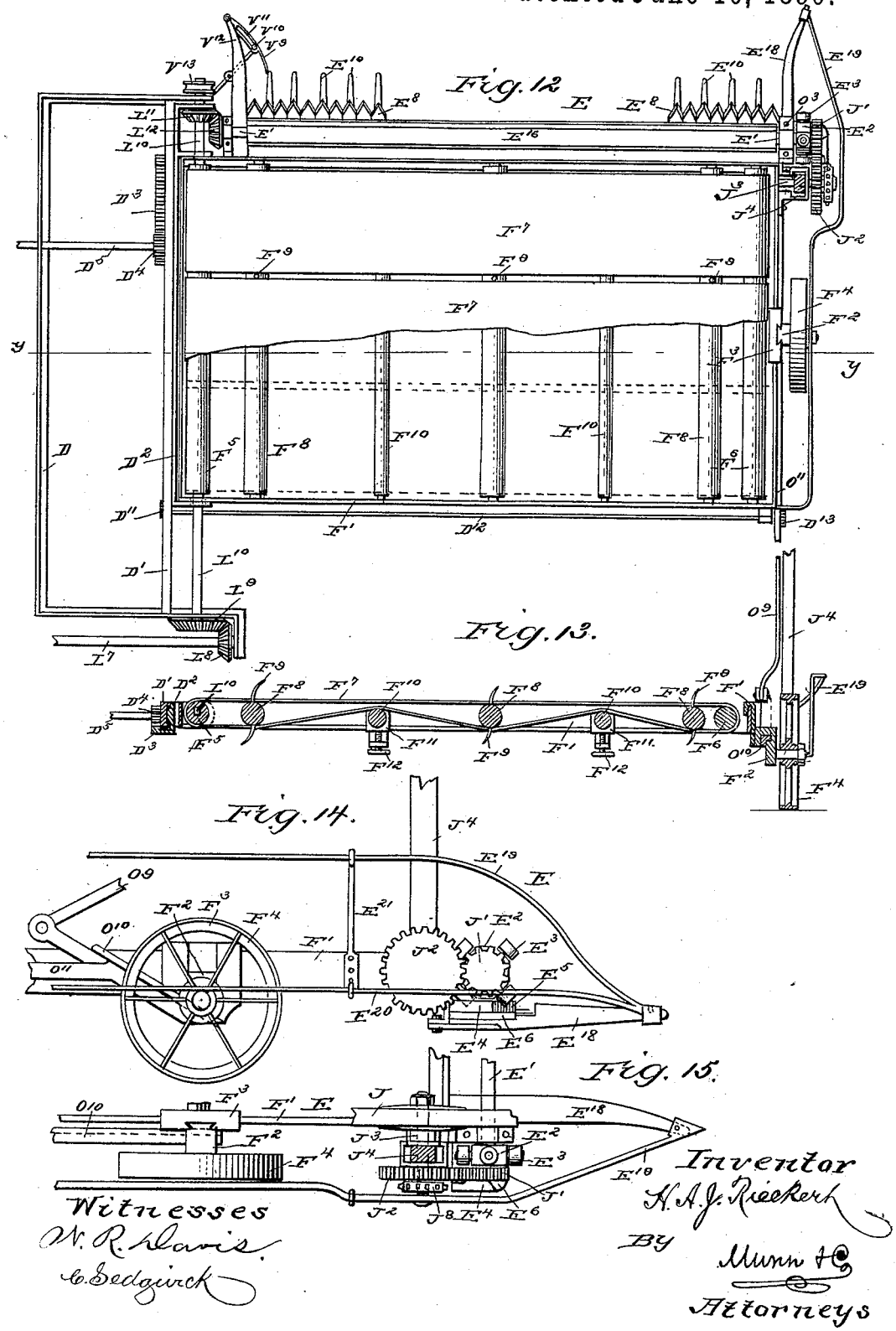

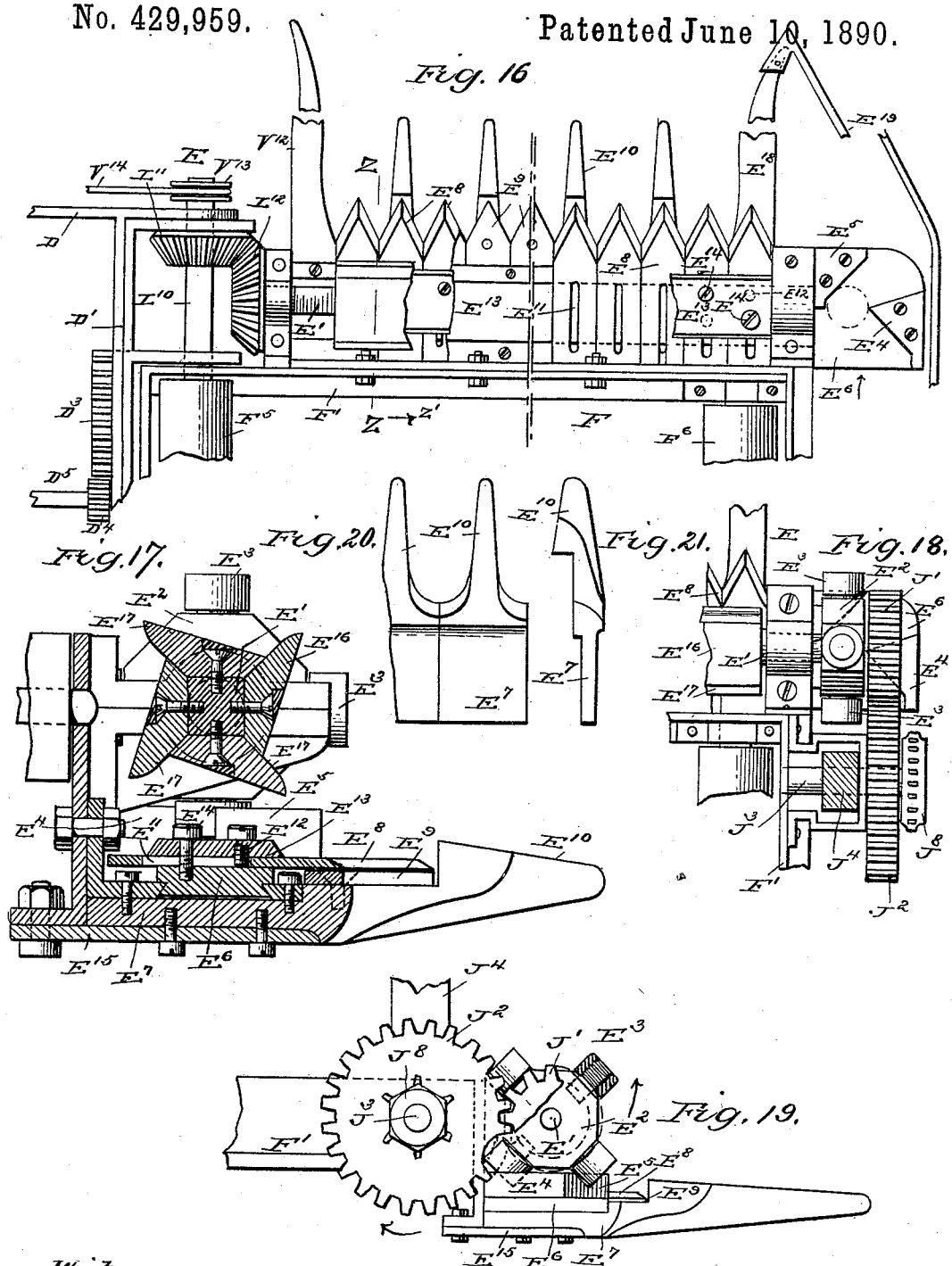

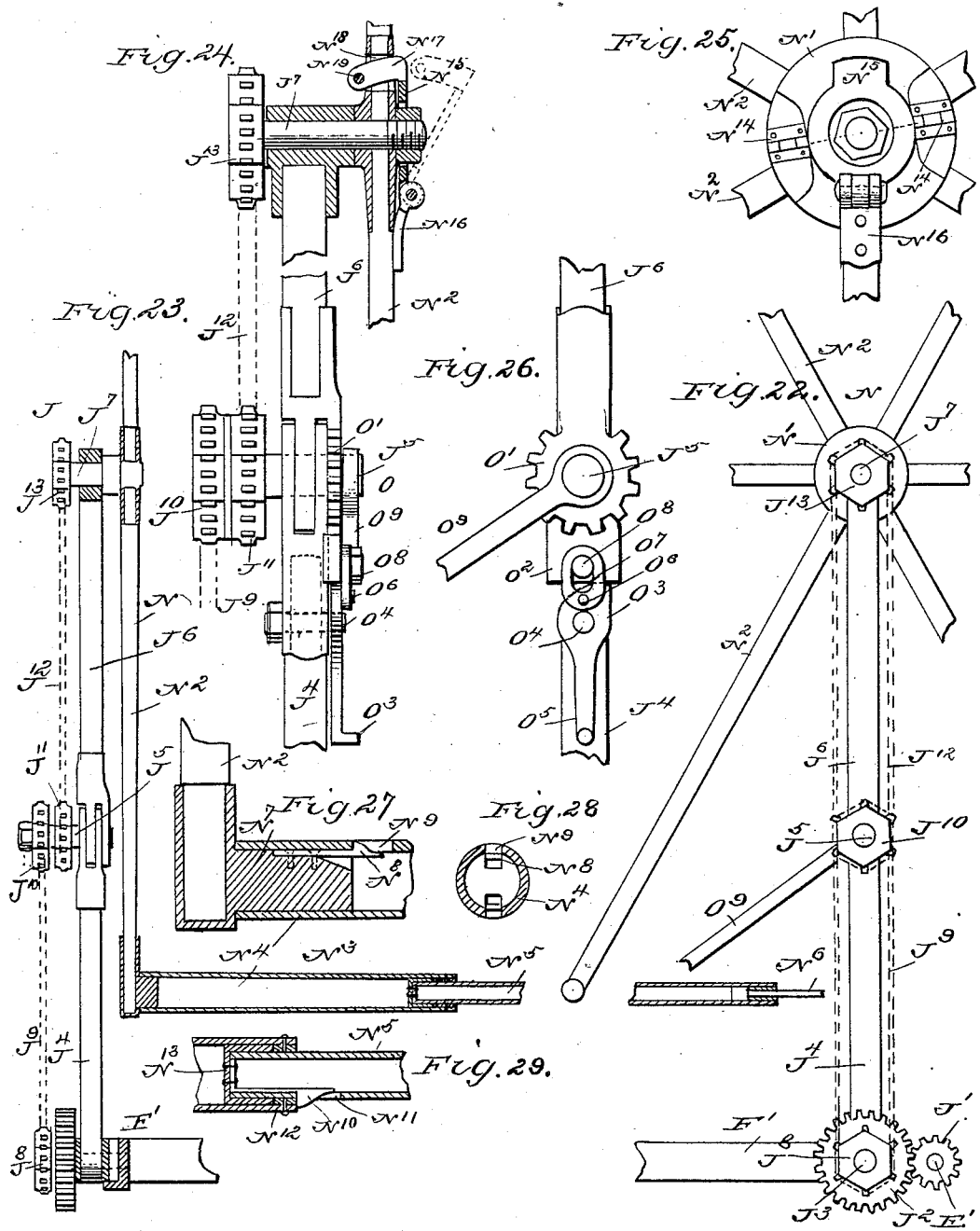

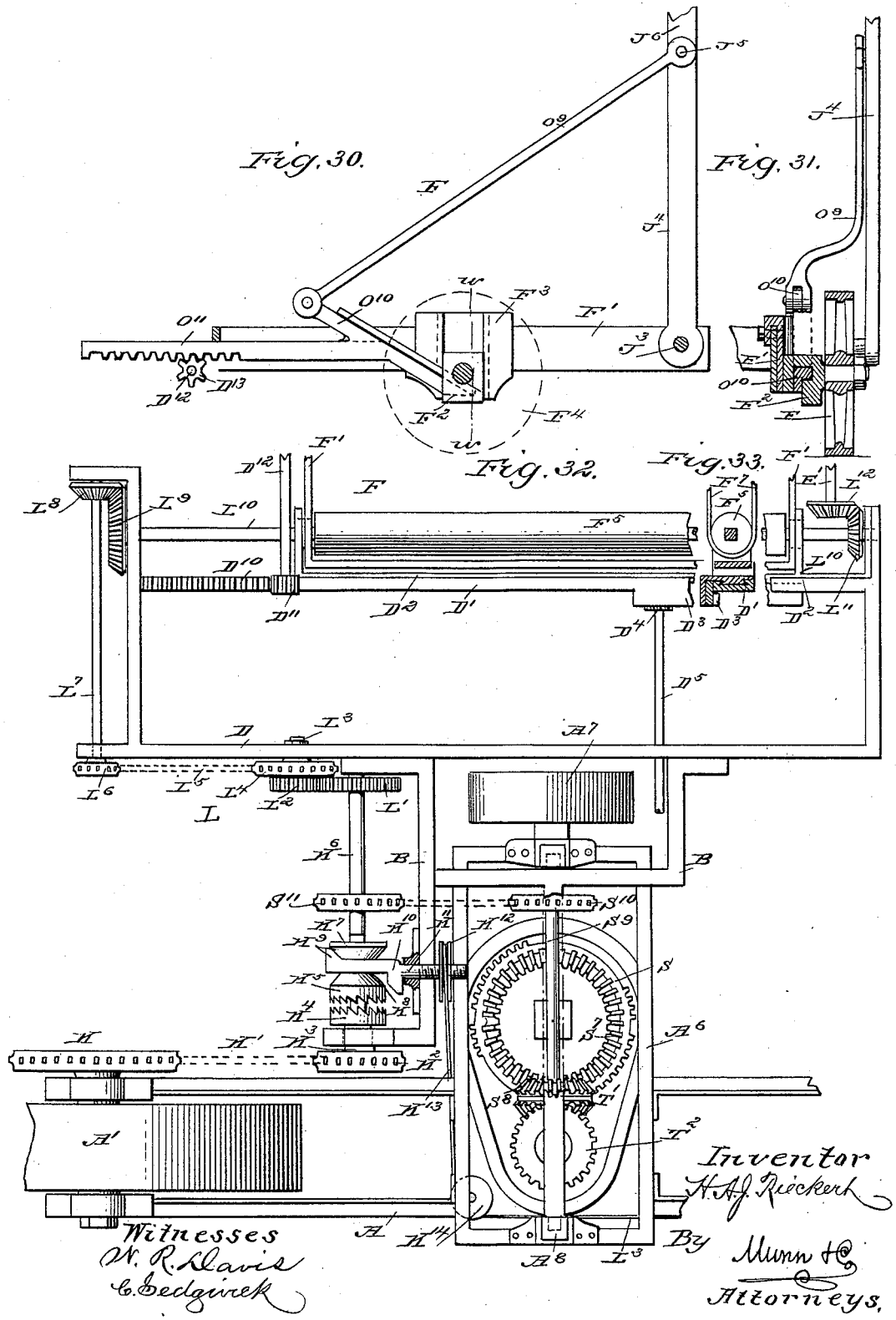

(No Model.)  13 Sheets—Sheet 10.
H. A. J. RIECKERT.
HARVESTER.
No. 429,959. Patented June 10, 1890.
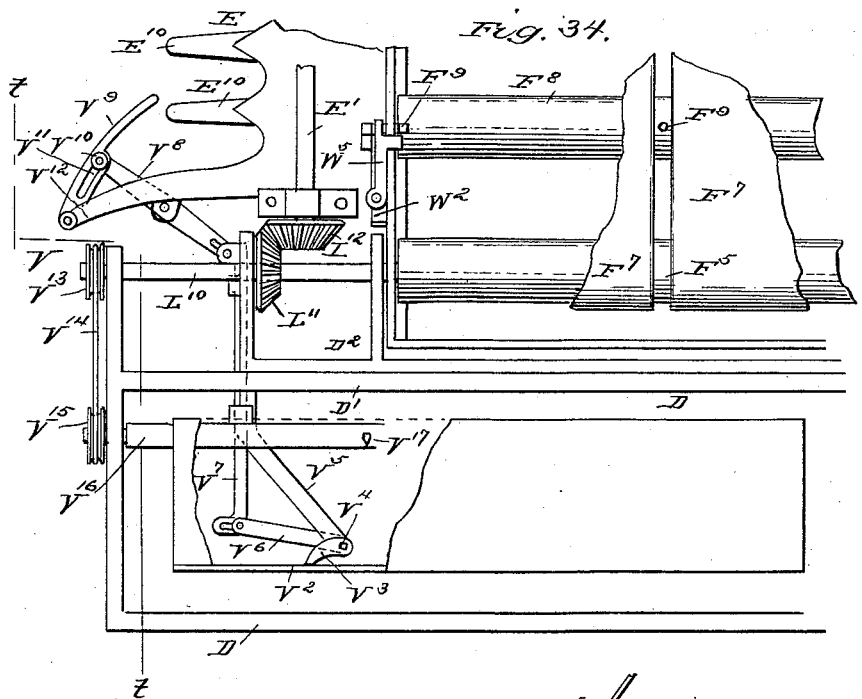
Fig. 34.
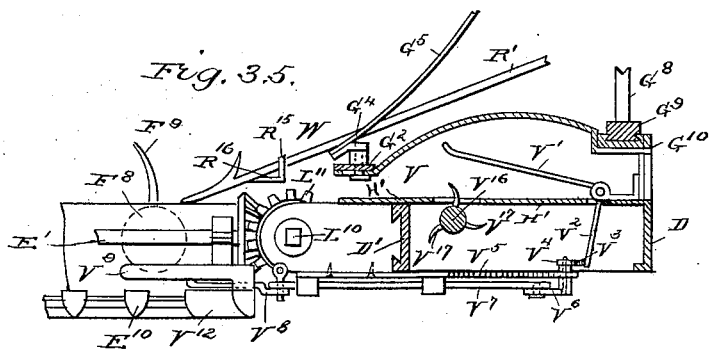
Fig. 35.
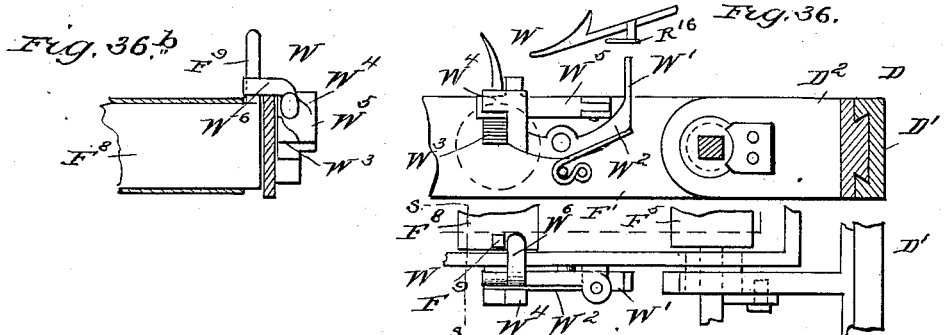
Fig. 36.ᵇ  Fig. 36.  Fig. 36.ᵃ
Witnesses
W. R. Davis
C. Sedgwick
Inventor
H. A. J. Rieckert
By Munn & Co.
Attorneys

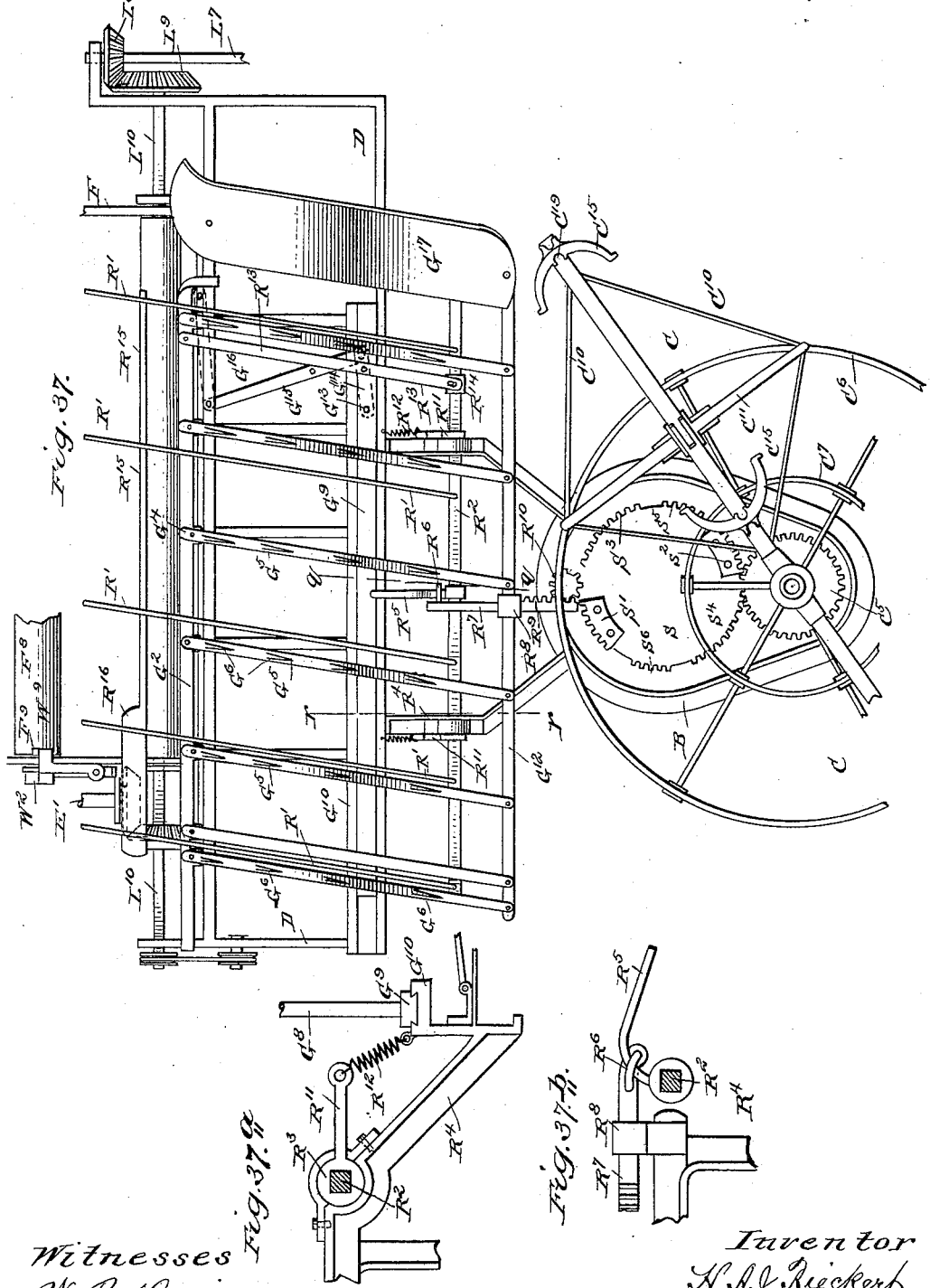

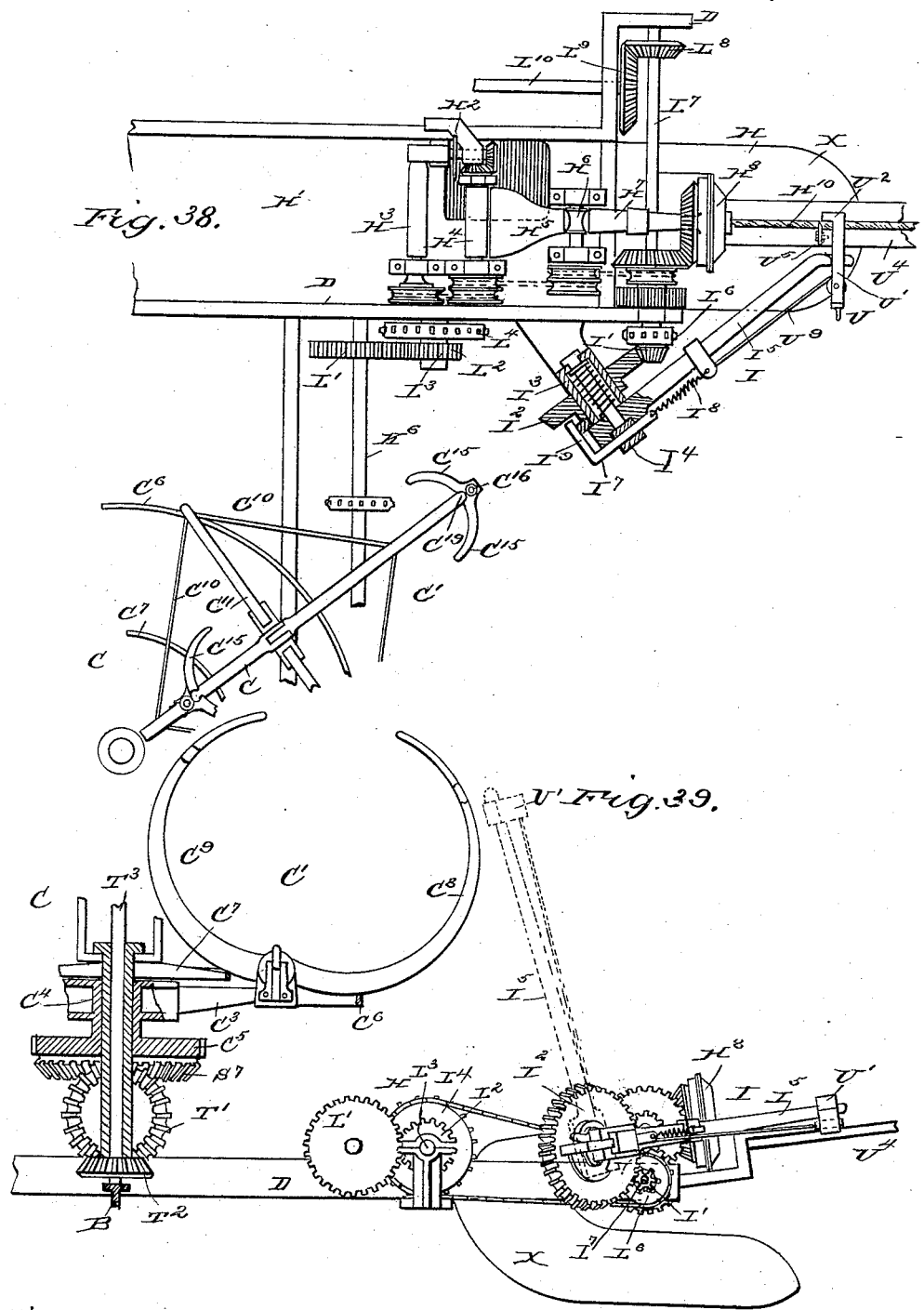

(No Model.) H. A. J. RIECKERT. 13 Sheets—Sheet 13.
HARVESTER.
No. 429,959. Patented June 10, 1890.
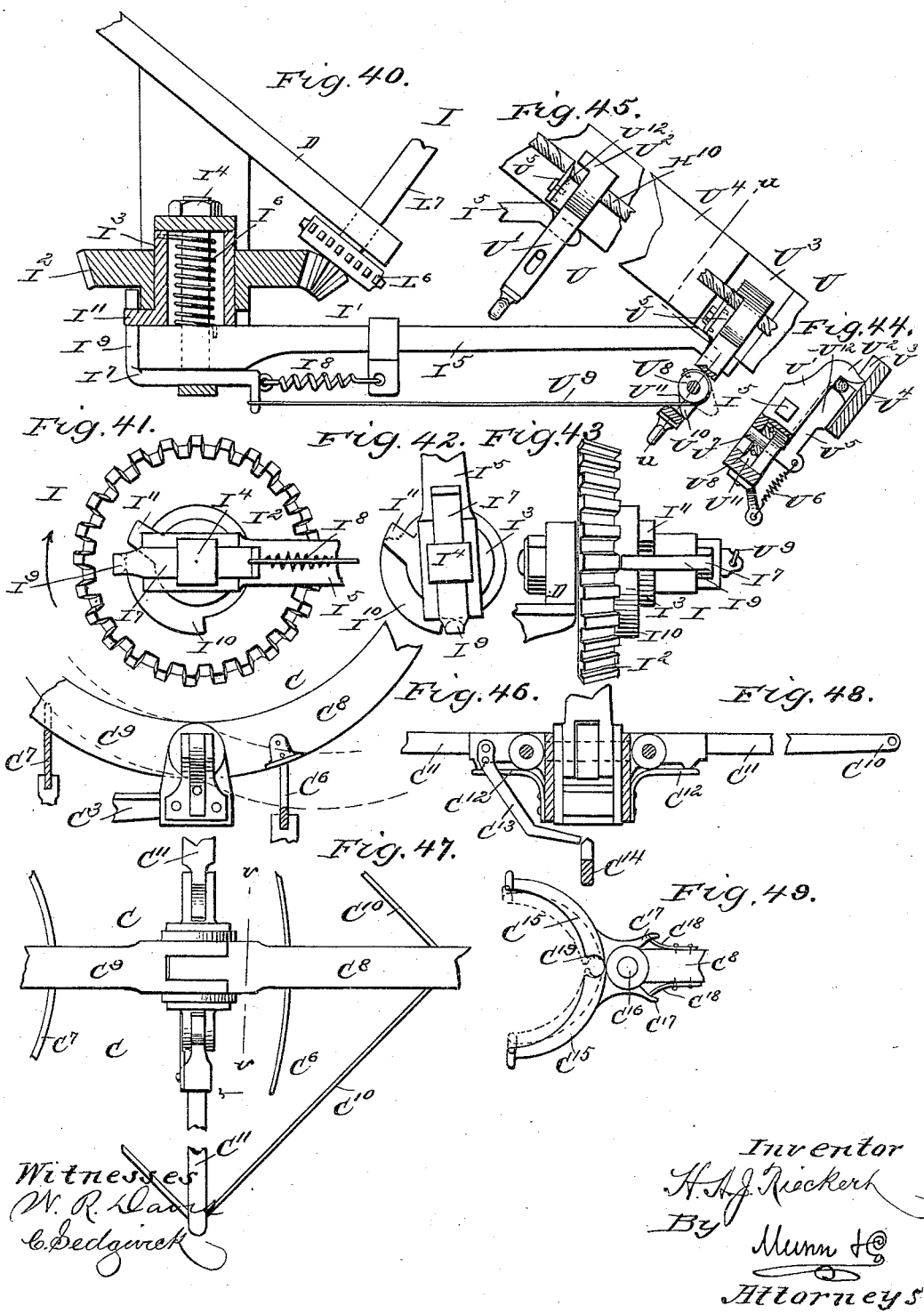
Witnesses
W. R. Davis
C. Sedgwick
Inventor
H. A. J. Rieckert
By Munn & Co
Attorneys

UNITED STATES PATENT OFFICE.

HERMAN A. J. RIECKERT, OF NEW YORK, N. Y.

HARVESTER.

SPECIFICATION forming part of Letters Patent No. 429,959, dated June 10, 1890.

Application filed December 19, 1889. Serial No. 334,310. (No model.)

*To all whom it may concern:*

Be it known that I, HERMAN A. J. RIECKERT, of the city, county, and State of New York, have invented a new and Improved Harvester, of which the following is a full, clear, and exact description.

The invention relates to harvesters in which part of the grain cut is formed into a band to tie the sheaf, the special mechanism for forming the band being preferably of the construction shown and described in the application for United States Letters Patent for a straw-twisting machine, Serial No. 317,082, filed by me July 10, 1889, allowed October 2, 1889, and issued April 8, 1890, No. 425,187, and the special mechanism for tying the band around the sheaf of grain being preferably of the construction shown and described in the United States Letters Patent for a self-binder, Serial No. 322,528, filed by me August 31, 1889.

The object of the invention is to provide a new and improved harvester which is automatic and very effective in operation, and in which the grain is readily cut, formed into sheaves, and a part of it is used for automatically forming bands, which are automatically tied around the sheaves, so that the latter are discharged in perfect shape from the harvester.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a front view of the same. Fig. 3 is an enlarged transverse section of part of the improvement. Fig. 4 is a sectional plan view of part of the improvement on the line $x\ x$ of Fig. 3. Fig. 5 is a side elevation of the same. Fig. 6 is a front view of part of the same. Fig. 7 is a side elevation of the outer cam for the binding mechanism and shown in an extended line. Fig. 8 is a like view of the inner cam for the same. Fig. 9 is an enlarged side elevation of the front end of the machine. Fig. 10 is a front view of the same. Fig. 11 is a plan view of the same with parts removed. Fig. 12 is a plan view of the cutting mechanism and platform with parts in section. Fig. 13 is a transverse section of the same on the line $y\ y$ of Fig. 12. Fig. 14 is an enlarged side elevation of the same as seen from the grain side. Fig. 15 is a plan view of the same. Fig. 16 is an enlarged plan view, with parts broken out, of the cutting mechanism. Fig. 17 is an enlarged sectional side elevation of the same on the line $z\ z$ of Fig. 16, looking in the direction of the arrow $z'$. Fig. 18 is a plan view of the mechanism for moving the cutter-bar and reel. Fig. 19 is a side elevation of the same with parts broken out and parts in section. Fig. 20 is a plan view of the cutter-guard. Fig. 21 is a side elevation of the same. Fig. 22 is a side elevation of the reel and its support. Fig. 23 is a transverse section of part of the same. Fig. 24 is an enlarged transverse section of a part of the same. Fig. 25 is a side elevation of the joint for folding the reel. Fig. 26 is a side elevation of the mechanism for raising or lowering the reel. Fig. 27 is an enlarged transverse section of the joint between the spoke and the reel-arm of the reel. Fig. 28 is a sectional end view of the same. Fig. 29 is an enlarged sectional side elevation of the horizontal telescoping reel-arm joint. Fig. 30 is an enlarged side elevation, with parts in section, of the mechanism for raising and lowering the reel and platform on the grain side. Fig. 31 is a transverse section of the same on the line $w\ w$ of Fig. 30. Fig. 32 is an inverted plan view of the general driving mechanism, parts being in section. Fig. 33 is a transverse section of part of the same. Fig. 34 is a plan view of the regulating device for the straw-band machine, parts being broken out. Fig. 35 is a transverse section of the same on the line $t\ t$ of Fig. 34. Fig. 36 is an enlarged front view of the locking device for the same, with parts in section. Fig. 36$^a$ is a plan view of the same. Fig. 36$^b$ is a sectional side elevation of the same on the line $s\ s$ of Fig. 36$^a$. Fig. 37 is a plan view of the elevator and binder, the former being shown in an inclined position for elevating short grain to the binder. Fig. 37$^a$ is a transverse section of part of the same on the line $r\ r$ of Fig. 37. Fig. 37$^b$ is a transverse section of part of the same on the line

*g g* of Fig. 37. Fig. 38 is a plan view, with parts in section, of the straw-band machine and mechanism for placing the band onto the binder. Fig. 39 is a side elevation of the same with parts in section. Fig. 40 is an enlarged plan view, with parts in section, of the band-carrier for transmitting the band from the twisting-machine to the binder. Fig. 41 is a front view of part of the same. Fig. 42 is a like view of the same in another position. Fig. 43 is a side elevation of the same. Fig. 44 is a transverse section of the same on the line *u u* of Fig. 40. Fig. 45 is a plan view of part of the same. Fig. 46 is an enlarged side elevation, with parts in section, of the sheaf-carrying arms and cams of the binder. Fig. 47 is a plan view of the same. Fig. 48 is a transverse section of the same on the line *v v* of Fig. 47. Fig. 49 is a plan view of the forked end of one of the sheaf-carrying arms of the binder. Fig. 50 is an enlarged plan view of the upper end of the elevator. Fig. 51 is an enlarged sectional end view of the elevator-slide and connection. Fig. 52 is a face view of part of one of the carrier-bars for the elevator. Fig. 53 is an enlarged plan view of part of the lower end of the elevator, and Fig. 54 is a sectional end elevation of the same.

The improved harvester is provided with a suitably-constructed main frame A, on the rear end of which is mounted to turn in suitable bearings the driving-wheel $A'$. In the front end of the main frame A is held the guide-wheel $A^2$, mounted in a frame $A^3$, pivoted at $A^4$ to the front end of the main frame A, so that the axis of the said wheel can be turned horizontally in order to move the machine around curves. On the axis of the guide-wheel $A^2$ is held to swing vertically a clevis $A^5$, to which the team for pulling the machine is hitched in the usual manner.

Between the driving-wheel $A'$ and the front guide-wheel $A^2$ on the main frame A is arranged a transversely-extending rectangular frame $A^6$, in which is held to slide vertically a frame B, carrying the self-binding mechanism C, preferably of the construction shown and described in the patent above referred to. On the inner end of the frame $A^6$ is mounted to turn in suitable bearings a wheel $A^7$, adapted to travel on the ground and serving to assist in supporting the frame A.

In order to make the frame B, supporting the self-binder C, slide vertically, the said frame is provided on its ends with trunnions $B'$, engaging boxes $B^2$, held to slide vertically in bearings $A^8$, formed in the ends of the transversely-extending frame $A^6$. On the inner end of the frame B is rigidly secured an auxiliary frame D, on which is mounted to slide longitudinally the grain-platform F, which supports at its front end the cutting mechanism E and on which falls the grain cut by the cutting mechanism E, and which transfers the cut grain to the elevator G, adapted to move the cut grain upward in bundles onto the self-binder C. On the rear end of the auxiliary frame D is supported the straw-twisting machine H, preferably of the construction shown and described in the application for patent above referred to. Said frame also supports, next to the straw-twisting machine H, the band cutting and transmitting mechanism I, which cuts the band formed by the band-machine H to the desired length, and transmits it to the self-binder C to tie the bundle of grain delivered by the elevator G into a sheaf.

Over the platform F operates the reel J, provided with telescoping reel-arms, as hereinafter more fully described.

The several mechanisms above referred to are hereinafter described in detail in the regular order.

Motion is imparted to the several devices principally from the main driving-wheel $A'$, which carries on the inner end of its shaft a sprocket-wheel K, over which passes a sprocket-chain $K'$, also passing over a sprocket-wheel $K^2$, secured on a hub $K^3$, mounted to turn in suitable bearings in a bracket projecting from the frame B. A clutch-wheel $K^4$ is secured on the inner end of the hub $K^3$, and is adapted to be engaged by a clutch $K^5$, mounted to slide on and to turn with a shaft $K^6$, mounted to turn with one end in the hub $K^3$, and with its other end in a suitable bearing formed on the frame B. (See Fig. 32.) The clutch $K^5$ is provided with two cones $K^7$ and $K^8$, adapted to be alternately engaged by wedges or inclines $K^9$ and $K^{10}$ respectively, secured on a screw-rod $K^{11}$, mounted to slide longitudinally, so as to move the said wedges alternately in contact with the cones $K^7$ and $K^8$ to engage the teeth of the clutch $K^5$ with the teeth of the clutch $K^4$ or disengage them from the same. (See Figs. 4 and 32.)

In order to move the screw-rod $K^{11}$ longitudinally, it is mounted in suitable bearings in the frame B, and carries on its threaded portion a grooved nut-wheel $K^{12}$, over which passes an endless belt $K^{13}$, also passing over a horizontally-arranged double pulley $K^{14}$, mounted to turn in suitable bearings in the front part of the transverse frame $A^6$. The endless belt $K^{13}$, after leaving the double pulley $K^{14}$, passes over and around a pulley $K^{15}$, mounted to turn on a stud near the front end of the main frame A. (See Figs. 9, 10, and 11.) On the pulley $K^{15}$ is secured another pulley $K^{16}$, over which passes an endless belt $K^{17}$, extending slightly upward and forward, as is plainly shown in Fig. 9, and passing over a pulley $K^{18}$, on the face of which is secured a pulley $K^{19}$, over which passes another endless belt $K^{20}$, extending upward and passing over a pulley $K^{21}$, fastened on a shaft $K^{22}$, mounted to turn in suitable bearings in a bracket $A^{13}$, projecting from the seat-frame $A^9$, carrying the driver's seat $A^{10}$, and fastened on the front end of the main frame A. On the shaft $K^{22}$ is secured a hand-wheel $K^{23}$, which is taken hold of by the driver seated on the seat $K^{10}$ and turned so as to engage the clutch $K^5$ with the clutch $K^4$, or disengage it from the same, in order to start or stop the mechanisms to be actuated from the main driving-wheel $A'$. The pulleys $K^{18}$ and $K^{19}$ are mounted to turn on a stud held on a bracket $A^{11}$, secured to the seat-frame $A^9$, which latter is also provided with a foot-rest $A^{12}$ for the driver's feet, as is plainly shown in Figs. 9, 10, and 11.

When the operator turns the hand-wheel $K^{23}$ in one direction, the several belts $K^{20}$, $K^{17}$, and $K^{13}$ are set in motion, so that the grooved nut-wheel $K^{12}$ turns the screw-rod $K^{11}$, whereby the latter slides longitudinally, and by either the wedge or incline $K^9$ or $K^{10}$ engages the cone $K^7$ or $K^8$, respectively, which engage or disengage the clutch $K^5$ or the clutch $K^4$. When the machine is moved forward, a rotary motion is imparted from the main driving-wheel $A'$ to the hub $K^3$, and when the clutch $K^5$ is engaged with the clutch $K^4$ on the said hub the shaft $K^6$ is turned. When the clutch $K^5$ is disengaged from the clutch $K^4$, then the shaft $K^6$ ceases to rotate, even if the machine is moved forward and the main driving-wheel $A'$ turns.

The shaft $K^6$ is connected by a mechanism L with the cutting mechanism E, so as to actuate the latter in order to cut the grain. This mechanism is constructed and operates as follows: On the shaft $K^6$ is secured a gear-wheel $L'$, meshing into a gear-wheel $L^2$, secured on a stud $L^3$, mounted to turn in suitable bearings on the auxiliary frame D and also carrying a sprocket-wheel $L^4$, over which passes a sprocket-chain $L^5$, also passing over a sprocket-wheel $L^6$, secured at one end of a shaft $L^7$, extending transversely and mounted to turn in suitable bearings in the rear end of the auxiliary frame D. (See Figs. 1, 4, and 32.) On the other end of the shaft $L^7$ is secured a bevel-pinion $L^8$, meshing into a bevel gear-wheel $L^9$, secured on one end of a transversely-extending shaft $L^{10}$, also mounted to turn in suitable bearings on the auxiliary frame D, and on which is mounted to slide and to turn with it a bevel gear-wheel $L^{11}$, meshing into a bevel gear-wheel $L^{12}$, secured at one end of a transversely-extending shaft $E'$, which is the driving-shaft for the cutting mechanism E and the reel J. When the shaft $K^6$ is rotated, as previously described, from the main driving-shaft $A'$, it imparts motion by the gear-wheels $L'$ and $L^2$ to the sprocket-wheel $L^4$, the sprocket-chain $L^5$, and the sprocket-wheel $L^6$, so that the shaft $L^7$ is rotated, which by the gear-wheels $L^8$ and $L^9$ imparts a rotary motion to the shaft $L^{10}$, and the latter, by the gear-wheels $L^{11}$ and $L^{12}$, rotates the shaft $E'$, so that the latter actuates the cutting mechanism E and the reel J.

The driving-shaft $E'$ of the cutting mechanism E is mounted to turn in suitable bearings on the front end of the platform-frame $F'$, and is provided on its outer end on the grain side of the machine with a wheel $E^2$, provided with four friction-rollers $E^3$, mounted to turn on suitable studs projecting from the periphery of the wheel, as is plainly shown in Figs. 1, 12, 14, 15, 17, 18, and 19. The friction-rollers $E^3$ of the wheel $E^2$ are arranged equal distances apart on the periphery of the wheel, and are adapted to engage alternately the angularly-arranged edge of a plate $E^4$, (see Fig. 16,) and then each friction-roller engages the angularly-arranged edge of another plate $E^5$, both plates $E^4$ and $E^5$ being secured on the outer end of the cutter-bar $E^6$, mounted to slide transversely in suitable bearings on the top of the guard-plate $E^7$. The plates $E^4$ and $E^5$ are arranged with their angular edges in such a manner that when one of the friction-rollers $E^3$ first engages the plate $E^4$ the cutter-bar $E^6$ is moved outward, and when the said friction-roller travels over the end of said angularly-arranged edge it passes directly onto the angular edge of the other plate $E^5$, which is oppositely arranged to the plate $E^4$, so that the cutter-bar $E^6$ is moved back by the said roller $E^3$ to the other side, so that each friction-roller $E^3$ by alternately engaging the plates $E^4$ and $E^5$ moves the cutter-bar outward and inward—that is, it imparts a full stroke to the cutter-bar. Thus at every revolution of the driving-shaft $E'$ the cutter-bar $E^6$ receives four full strokes. The number of friction-rollers $E^3$ on the wheel $E^2$ may be increased or lessened in number, as desired, to give more or less strokes to the cutter-bar at each revolution of the wheel $E^2$.

On top of the cutter-bar $E^6$ are secured the knives $E^8$, provided with the usual V-shaped cutting-edges and adapted to pass over the fixed similarly-shaped knives $E^9$, fastened in the rear part of the guards $E^{10}$, projecting in front of the knives $E^8$ and $E^9$ and of the usual construction. The guards $E^{10}$ are preferably formed on the guard-plate $E^7$, as is plainly shown in Figs. 17 and 19. The cutter-bar $E^6$ is preferably provided with a dovetail on its under side, which fits in a dovetailed groove formed by gibs secured on top of the guard-plate $E^7$, as shown in Fig. 17. Each of the knives $E^8$ on the cutter-bar $E^6$ is provided with a longitudinally-extending slot $E^{11}$, into which passes a pin secured on the under side of a transversely-extending plate $E^{13}$, passing over the tops of all the knives $E^8$, and held in place by bolts $E^{14}$, screwing in the transversely-extending cutter-bar $E^6$ and passing through the slots $E^{11}$ in the knives. The pins $E^{12}$, in conjunction with the bolts $E^{14}$, serve to hold the knives in proper alignment. By loosening the bolts $E^{14}$ each knife $E^8$ can be moved forward or rearward until it has reached its proper position in relation to the fixed knives $E^9$ on the guard-plate $E^7$.

When the several knives $E^8$ are adjusted, the bolts $E^{14}$ are screwed up, so that the plate $E^{13}$ clamps the several knives $E^8$ in place on the cutter-bar $E^6$. It will be seen that this adjustment of the knives $E^8$ compensates for the wear of the knives at the cutting-edges and for the grinding, so that the cutting-edges of the knives are always in line over the cutting-edges of the fixed knives $E^9$. The guard-plate $E^7$ is secured at its under side to a transversely-extending plate $E^{15}$, fastened to the movable frame $F'$ of the platform $F$.

When the machine is used for cutting very short grain, a wheel $E^{16}$ is secured on the shaft $E'$ directly over and slightly in the rear of the knives $E^8$, so that the grain falls over the said wheel when cut by the knives $E^8$ and $E^9$ onto the platform $F$. This wheel $E^{16}$ is preferably of the construction shown in detail in Fig. 17, being provided with a number of arms $E^{17}$, projecting one beyond the other and slightly rounded at one side, so that the grain falling on the said wheel rests with its butt-ends against the projecting ribs or ends of the arms $E^{17}$, whereby the latter throw the same forward onto the platform when the shaft $E'$ rotates. The guard $E^{18}$ nearest the grain side is somewhat longer than the others, and is connected at its outer end with outwardly-bent rods $E^{19}$ and $E^{20}$, extending rearward and forming a guard for the mechanism for moving the cutter-bar and the mechanism for operating the reel, so that the grain in the field is prevented from clogging up the said mechanism. A connecting-bar $E^{21}$ connects the rods $E^{19}$ and $E^{20}$ with each other, said connecting bar or rod being fastened to the movable frame $F'$ of the platform. The reel J is also operated from the shaft $E'$, and for this purpose the latter is provided with a gear-wheel $J'$, arranged on the outside of the wheel $E^2$ and in mesh with a gear-wheel $J^2$, fastened on a short shaft $J^3$, mounted to turn in suitable bearings on the outside of the frame $F'$ of the platform $F$. On this shaft $J^3$ is fulcrumed an upwardly-extending post $J^4$, carrying a shaft $J^5$ near its upper end, on which is fulcrumed a second post $J^6$, carrying in its upper end the shaft $J^7$, on which the reel-wheel proper N is mounted. The shaft $J^7$ is connected with the shaft $J^3$ by a sprocket-wheel $J^8$, secured on the said shaft $J^3$, and over which passes a sprocket-chain $J^9$, also passing over a sprocket-wheel $J^{10}$, secured on the shaft $J^5$, which also carries a sprocket-wheel $J^{11}$, over which passes a sprocket-chain $J^{12}$, also passing over a sprocket-wheel $J^{13}$, secured on the said shaft $J^7$. Thus when the shaft $E'$ is rotated it imparts a rotary motion by the gear-wheels $J'$ and $J^2$ to the shaft $J^3$, and the latter, by the sprocket-wheels $J^8$ and $J^{10}$ and the sprocket-chain $J^9$, imparts a rotary motion to the shaft $J^5$, which, by the sprocket-wheels $J^{11}$ and $J^{13}$ and the sprocket-chain $J^{12}$, rotates the shaft $J^7$, so that the reel-wheel N is turned.

The reel-wheel proper N is provided with a hub $N'$, secured on the shaft $J^7$ and supporting a series of radial reel arms or spokes $N^2$, each of which supports at its outer end a horizontal arm $N^3$, preferably made in a number of telescoping sections $N^4$, $N^5$, and $N^6$, which can be extended or folded up, as desired, or entirely removed from the reel arm or spoke $N^2$. The innermost section $N^4$ is made of a piece of pipe secured on a projection $N^7$, fastened on the outer end of the spoke $N^2$. A spring $N^8$ is fastened on the said projection $N^7$, and is provided with a hook adapted to pass into a slot $N^9$, formed in the section $N^4$ from the inside, so as to lock said section in place on the said projection. (See Figs. 27 and 28.) When the operator desires to remove the entire arm $N^3$ from its spoke, he presses the spring $N^8$ inward and then slides the inner end of the section $N^4$ off the projection $N^7$. The middle section $N^5$ supports at its inner end a spring $N^{10}$, also provided with a hook passing from the inside through an aperture $N^{11}$ in the section $N^5$. The outer end of the hook of the spring $N^{10}$ is adapted to engage the outer edge of the section $N^4$ when the section $N^5$ is extended, so as to lock the latter in an extended position. It is understood that the section $N^5$ cannot be pulled out of the section $N^4$ on account of the collar $N^{12}$, secured at the outer end of the section $N^4$ and forming a stop for a cap $N^{13}$, secured to the inner end of the section $N^5$, as is plainly shown in Fig. 29. When the operator desires to move the section $N^5$ into the section $N^4$, he presses the spring $N^{10}$ inward, so that the latter disengages the collar $N^{12}$ and permits of sliding said section $N^5$ inward into the section $N^4$. When the operator pulls the section $N^5$ out, the spring $N^{10}$ snaps into place to lock the section $N^5$ in an extended position on the section $N^4$. The outermost section $N^6$ is preferably a rod held to slide in the section $N^5$.

The hub $N'$ is made in two halves, so as to fold the reel N whenever desired. The two sections are hinged together by hinges $N^{14}$, located diametrically opposite each other, as is plainly shown in Fig. 25. A plate $N^{15}$ is pivoted to an arm $N^{16}$, fastened on one of the spokes between the hinges $N^{14}$, the free end of the said plate $N^{15}$ being provided with a transversely-extending arm $N^{17}$, adapted to pass through an opening $N^{18}$, formed in one of the halves of the hub $N'$. In the outer end of the arm $N^{17}$ is formed an aperture to permit of inserting a pin $N^{19}$, adapted to extend across the aperture $N^{18}$, so as to rest against the back of the hub $N'$, serving to lock the two halves of the hub in position.

When the operator desires to fold the reel proper N for transporting the machine from place to place, he removes the pin $N^{19}$ and swings the plate $N^{14}$ outward into the position shown in dotted lines in Fig. 24, so that the two halves of the hub $N'$ can be folded one upon the other. It is understood that in case the operator desires to do this he first removes the arms $N^3$ in the manner above referred to. It is understood that the upper half of the reel is swung downward upon the lower half, so that the reel does not extend high up into the air, takes up little room, and can conveniently be folded, with the cutting mechanism E and platform F, against the elevator, as hereinafter more fully described.

The post $J^6$ can be swung into an inclined position in relation to the post $J^4$, so as to lower the reel proper N by a mechanism O, presently to be described. The post $J^6$ is provided at its lower end with a segmental gear-wheel $O'$, the center of which is the shaft $J^5$, said gear-wheel $O'$ being adapted to be engaged by a segmental gear-wheel plate $O^2$, held to slide on the upper end of the post $J^4$ and pressed in mesh with the said gear-wheel $O'$ by a cam $O^3$, fulcrumed at $O^4$ to the upper end of the post $J^4$. The handle $O^5$ on the said cam $O^3$ serves for conveniently operating the cam in order to move the said plate $O^2$ in or out of contact with the gear-wheel $O'$. A plate $O^6$ is pivoted on the cam $O^3$, and is provided with a slot $O^7$, through which passes a pin $O^8$, held on the gear-plate $O^2$. When the cam $O^3$ is swung downward, the plate $O^6$ draws the plate $O^2$ downward and out of mesh with the segmental gear-wheel $O'$, which can now be turned to move the upper post into an inclined position, after which the cam $O^3$ is again put in mesh with the wheel $O'$, thus locking the latter. A suitable locking device (not shown) is employed to hold the lever $O^5$ in place after adjusting the reel.

To the shaft $J^5$ is pivotally connected a downwardly and rearwardly extending link $O^9$, pivotally connected at its lower end with an inclined slide $O^{10}$, passing through a suitable slot in a box $F^2$, mounted to slide vertically in suitable bearings $F^3$, formed on the grain side of the platform-frame $F'$. A wheel $F^4$ is mounted on the said box $F^2$ and supports the grain side of the platform. The box, with its wheel $F^4$, is mounted to slide vertically, so as to raise or lower the platform, as desired. The mechanism for this movement is hereinafter more fully described. The platform-frame $F'$ is preferably rectangular, and through the front and rear passes the shaft $L^{10}$, previously mentioned, and connected with the cutting mechanism, as above described. This shaft $L^{10}$ forms the fulcrum for the platform F, so that the latter can be raised and lowered on the grain side by raising and lowering the wheel $F^4$.

In the platform-frame $F'$ are arranged longitudinally the end rollers $F^5$ and $F^6$, of which the roller $F^5$ is mounted to turn with and to slide on the square part of the shaft $L^{10}$, so that when the latter is rotated the said roller $F^5$ rotates with it. Over the rollers $F^5$ and $F^6$ passes a series of endless belts $F^7$, preferably three in number, placed short distances apart, as is plainly shown in Figs. 1 and 12. Between the end rollers $F^5$ and $F^6$ is arranged a series of rollers $F^8$, parallel with the rollers $F^5$ and $F^6$, and each provided with a number of curved prongs $F^9$, extending between two successive endless belts $F^7$. The prongs $F^9$ serve to move the grain to the elevator G. The roller $F^8$ next to the roller $F^5$ is adapted to be locked temporarily in place to permit grain to accumulate in front of its prongs, as hereinafter more fully described. Between the two successive rollers $F^8$ is arranged a roller $F^{10}$, pressing against the under side of the lower part of the endless belts $F^7$, and serving to take up any existing slack. The rollers $F^{10}$ are preferably mounted in boxes $F^{11}$, mounted to slide vertically in suitable bearings in the platform-frame $F'$, and the said boxes are raised or lowered to increase and diminish the tension of the belts $F^7$ by set-screws $F^{12}$, as is plainly shown in Fig. 13.

The mechanism for shifting the platform F with the cutting mechanism E forward and backward is arranged as follows: The auxiliary frame D is provided with a longitudinally-extending bar $D'$, on the side of which nearest to the platform-frame $F'$ is formed a dovetailed groove engaged by a correspondingly-shaped dovetail formed on a U-shaped frame $D^2$, engaging with its ends the front and rear sides of the platform-frame $F'$, and also engaging by an extension on one end the gear-wheel $L^{11}$ to move the latter on the shaft $L^{10}$ with the platform F. (See Fig. 34.) Through the said end also passes the shaft $L^{10}$. On the under side of the frame $D^2$ is formed a rack $D^3$, engaged by a gear-wheel $D^4$, secured on a shaft $D^5$, mounted to turn in suitable bearings in the frame D and extending transversely to the outer side of the main frame A, as is plainly shown in Fig. 5. On the outer end of the shaft $D^5$ is secured a bevel gear-wheel $D^6$, meshing into a bevel gear-wheel $D^7$, fastened at one end of a shaft $D^8$, extending longitudinally and mounted to turn in suitable bearings held on the main frame A. On the front end of the shaft $D^8$ is secured a bevel gear-wheel $D^9$, meshing into a bevel gear-wheel $P'$, secured on a shaft $P^2$, forming part of a mechanism P for moving the platform F forward and backward, according to the length of grain to be cut. The said mechanism also connects with a suitable device, hereinafter more fully described, for raising and lowering the frame B, which carries the self-binder.

The shaft $P^2$ extends upward and is mounted to turn in suitable bearings in the brackets $A^{13}$ and $A^{14}$, previously mentioned, and on the upper end of the shaft $P^2$ is secured a hand-wheel $P^3$, which is taken hold of and turned by the operator seated in the seat $A^{10}$. Near the middle of the shaft $P^2$ is secured a grooved collar $P^4$, engaged by an arm $P^5$, secured on a shaft $P^6$, mounted to turn in suitable bearings in the seat-frame $A^9$ and carrying a forwardly-projecting treadle or arm $P^7$, extending upward a short distance above the foot-rest $A^{12}$ and adapted to be engaged by the operator's foot, so that the said arm $P^7$ is pressed downward to turn the shaft $P^6$, whereby the arm $P^5$ raises the shaft $P^2$ and moves the gear-wheel $P'$ out of contact with the gear-wheel $D^9$. On the lower end of the shaft and next to the said gear-wheel $P'$ is arranged a bevel gear-wheel $P^8$, which, when the said shaft $P^2$ is raised, as above described, is thrown in mesh with the gear-wheel $P^9$, fastened at the end of a shaft $P^{10}$, extending rearward and mounted to turn in suitable bearings on the main frame A. When the operator has pressed the arm $P^7$ downward with his foot and the shaft $P^2$ is thereby raised, then he can impart a rotary motion to the shaft $P^{10}$ by turning the hand-wheel $P^3$. This latter shaft $P^{10}$ is connected with the mechanism Q for raising and lowering the frame B in the following manner: At the other end of the shaft $P^{10}$ is secured a bevel gear-wheel $P^{11}$, meshing into a bevel gear-wheel $Q'$, secured on a shaft $Q^2$, extending transversely and mounted to turn in suitable bearings on the main frame A near the rectangular frame $A^6$. On the extreme outer end of the shaft $Q^2$, next to the gear-wheel $Q'$, is arranged a gear-wheel $Q^3$, and on the opposite end of the said shaft is secured another gear-wheel $Q^4$, said gear-wheels $Q^3$ and $Q^4$ meshing in bevel gear-wheels $Q^5$ and $Q^6$, secured on the longitudinally-extending shafts $Q^7$ and $Q^8$, arranged on the outsides of the ends of the rectangular frame $A^6$, as is plainly shown in Fig. 4. The shafts $Q^7$ and $Q^8$ carry the bevel gear-wheels $Q^9$ and $Q^{10}$, respectively meshing into bevel gear-wheels $Q^{11}$ and $Q^{12}$, respectively secured on the upper ends of screw-rods $Q^{13}$ and $Q^{14}$, held to turn in the main frame A and screwing in the boxes $B^2$, which carry the trunnions $B'$ of the frame B. Thus when the operator turns the hand-wheel $P^3$, while the shaft $P^2$ is held in an uppermost position, the frame B can be raised or lowered by the shaft $P^{10}$, imparting a rotary motion to the shafts $Q^2$, $Q^7$, and $Q^8$, of which the shafts $Q^7$ and $Q^8$, by their connection with the screw-rods $Q^{13}$ and $Q^{14}$, turn the latter, so that the boxes $B^2$ slide up and down in their bearings $A^8$ on the frame $A^6$, thus raising or lowering the frame B. When the operator releases the pressure on the arm $P^7$, then the shaft $P^2$ slides downward by its own weight, so as to disengage its gear-wheel $P^8$ from the gear-wheel $P^9$ and to engage the gear-wheel $P'$ with the bevel gear-wheel $D^9$. When the operator now turns the hand-wheel $P^3$, the shaft $D^8$ is turned and motion is transmitted to the shaft $D^5$, which, by its gear-wheel $D^4$ meshing into the rack $D^3$, causes a forward or backward sliding motion of the frame $D^2$, which carries the platform frame $F'$ and the platform F with it, all sliding on the shaft $L^{10}$.

The bar $D'$ of the auxiliary frame D is provided with a rack $D^{10}$, (see Figs. 4 and 32,) in mesh with a gear-wheel $D^{11}$, secured on one end of a shaft $D^{12}$, extending transversely under the platform F and mounted to turn in suitable bearings secured on the platform-frame $F'$. On the outer end of the shaft $D^{12}$ is secured a pinion $D^{13}$, in mesh with a rack $O^{11}$, extending horizontally from the incline $O^{10}$, previously mentioned, and connected by the link $O^9$ with the posts of the reel. Now when the frame $F'$ is moved forward or backward by the operator turning the hand-wheel $P^3$, as above described, the gear-wheel $D^{11}$ will roll on the rack $D^{10}$, consequently turning the shaft $D^{12}$, which, by its pinion $D^{13}$ engaging the rack $O^{11}$, moves the latter forward or backward, so that the incline $O^{10}$ raises or lowers the box $F^2$, thus raising or lowering the wheel $F^4$, supporting the grain side of the platform F. As the incline $O^{10}$ is connected by the link $O^9$ with the posts $J^1$ and $J^6$ of the reel, the said posts are swung so as to raise or lower the reel in relation to the platform F. Thus it will be seen that the movement of the platform F is simultaneous with the changing of the position of the reel J. The grain, after leaving the endless band $F^7$ on the platform F, passes onto the elevator G. (See Figs. 1, 2, 3, 37, and 50 to 54, inclusive.) The elevator G is shifted from the platform-frame $F'$, and is for this purpose provided at its lower end with brackets $G'$, secured on the auxiliary frame D, said brackets carrying a longitudinally-extending bar $G^2$, having slots $G^3$, in which are mounted to turn the pivot-pins $G^4$, secured to the under side at the lower ends of a series of rods $G^5$, extending upward and slightly curved in S form, as is plainly shown in Fig. 3. Each of the rods $G^5$ carries on its face a series of upwardly-extending prongs $G^6$, which prevent the grain from sliding down on the rods $G^5$. In about the middle of the rods $G^5$ and on the under side is secured a longitudinally-extending bar $G^7$, supported on a number of posts $G^8$, secured at their lower ends in a slide $G^9$, mounted in a guide $G^{10}$, secured on the auxiliary frame D. Near the upper ends of the rods $G^5$ is pivoted a longitudinally-extending board $G^{11}$, curved downward slightly at its upper edge to hold one end of the straw band down, as is plainly shown in Figs. 3 and 50. The extreme upper ends of the rods $G^5$ are pivotally connected with each other by a longitudinally-extending bar $G^{12}$, and these upper ends of the rods $G^5$ discharge into the holders of the self-binder C, as is hereinafter more fully described. The slide $G^9$ is rigidly connected with a rod $G^{13}$, extending downward (see Figs. 3, 37, and 51) and pivotally connected at its lower end by a link $G^{14}$ with a lever $G^{15}$, fulcrumed on the under side of the auxiliary frame D and pivotally connected by a link $G^{16}$ with the sliding frame $D^2$, so that when the latter is moved rearwardly and shifts the platform F in the same direction then the link $G^{16}$ pulls on the lever $G^{15}$, so that the link $G^{14}$ pushes on the rod $G^{13}$ and moves the slide $G^9$ forward, so that the rods $G^5$, turning on the pivot-pins $G^4$, are moved into the angular position shown in Fig. 37. At the rear ends of the longitudinally-extending bars $G^2$ and $G^{12}$ is pivotally connected a flanged plate $G^{17}$ of sufficient width to conveniently support the heads of the grain while the latter moves up the elevator to the holders of the self-binder C.

The grain is moved upward on the rods $G^5$ by a mechanism R, provided with a series of lifting-rods R', passing between the rods $G^5$ and pivoted at their inner ends on a longitudinally-extending square shaft $R^2$, held to slide longitudinally in collars $R^3$, mounted to turn in suitable bearings formed in brackets $R^4$, extending upward from the auxiliary frame D, as is plainly shown in Figs. 3, 37, and $37^a$. On a collar mounted to turn with and to slide on the shaft $R^2$ is secured a curved arm $R^5$, (see Fig. $37^b$,) engaged by an eye $R^6$, secured to a bar $R^7$, mounted to slide longitudinally in a suitable bearing $R^8$, secured on one of the brackets $R^4$. On the bar $R^7$ are arranged rack-teeth $R^9$, in mesh with a vertical pinion $R^{10}$, mounted to turn in suitable bearings on the frame B of the self-binder C. On each of the collars $R^3$ is secured an arm $R^{11}$, connected with one end of a spring $R^{12}$, fastened with its other end on the auxiliary frame D, so that when the said shaft $R^2$ is turned to move the rods R' upward its collars $R^3$ turn with it and the springs $R^{12}$ are compressed. When the rods R' are released after having attained their uppermost position, as hereinafter more fully described, the said compressed springs $R^{12}$ move the lifting-rods back into their lowermost position by turning the shaft $R^2$ in an inverse direction. The shaft $R^2$ is moved longitudinally in the collars $R^3$ by a lever $R^{13}$, fulcrumed at its outer end on the fixed plate $G^2$, pivotally connected near its middle with the slide $G^9$ and pivotally connected at its inner end with a collar $R^{14}$, mounted to turn on the shaft $R^2$, and moving the same longitudinally when the slide $G^9$ slides and actuates the lever $R^{13}$. This movement of the shaft $R^2$ is necessary to shift the pivotal ends of the lifting-rods R' in accordance with the movement of the rods $G^5$ when the latter are shifted to accommodate short grain, as shown in Fig. 37. The lower ends of the lifting-rods R' are pivotally connected with each other by a longitudinally-extending rod $R^{15}$, provided at its front end with a plate $R^{16}$, adapted to actuate a mechanism for temporarily stopping the motion of the roller $F^8$, located next the end roller $F^5$, as hereinafter more fully described.

The pinion $R^{10}$ receives an intermittent motion from segmental gears S' and $S^2$, fastened on the top face of the master-wheel S, forming part of the mechanism for the self-binder C. When the arms R' are in their lowermost position, as shown in Fig. 3, then the outer free ends of the said arms rest on the top of the belts $F^7$, near the first roller $F^8$, and are below the lower ends of the rods $G^5$, and when sufficient grain has accumulated on the lower end of the elevator G on the rods $G^5$, then one of the segmental gear-wheels S' or $S^2$ turns the pinion $R^{10}$ so that the latter slides the rack-bar $R^7$ transversely, whereby the eye $R^6$ pulls on the curved arm $R^5$, and thus imparts a turning motion to the shaft $R^2$, whereby the arms R' swing upward and lift the grain on the elevator-rods $G^5$ upward into the respective holder C' or $C^2$ of the self-binder C. The moment the respective segmental gear S' or $S^2$ is disengaged from the pinion $R^{10}$ the compressed springs $R^{12}$ quickly turn the shaft $R^2$ in an opposite direction, so that the lifting-rods R' swing downward to their normal position to take up another bundle of grain when the next segmental gear-wheel $S^2$ or S' turns the pinion $R^{10}$.

The self-binder C is fully described and shown in the application above referred to, and it is provided with holders C' and $C^2$, mounted on arms $C^3$, secured on a sleeve $C^4$ and projecting in opposite directions from the latter. On the sleeve $C^4$, which is mounted to turn, is secured a gear-wheel $C^5$, receiving an intermittent motion from sets of gear-teeth $S^3$, $S^4$, $S^5$, and $S^6$, formed on the periphery of the master-wheel S, previously mentioned. The master-wheel S is provided on its under side with a bevel gear-wheel $S^7$, which meshes into a bevel gear-wheel $S^8$, secured on a shaft $S^9$, mounted to turn in suitable bearings on the frame B and carrying a sprocket-wheel $S^{10}$, over which passes a sprocket-chain also passing over a sprocket-wheel $S^{11}$, secured on the driving-shaft $K^6$, receiving its rotary motion from the main drive-wheel A', as previously more fully described. On the shaft $S^9$ is also secured a bevel gear-wheel T', meshing into a bevel gear-wheel $T^2$, secured on the lower end of a vertically-extending shaft $T^3$, forming a part of the knotting device T, of the same construction as shown and described in the application for Letters Patent above referred to. A further description of this knotting device is not deemed necessary, as it operates in conjunction with the holders C' and $C^2$ in the manner fully set forth in the said application.

Each of the holders C' and $C^2$ is provided with fixed cams $C^6$ and $C^7$, on which travel the semicircular arms $C^8$ and $C^9$, pivoted on the arms $C^3$, and each of the said semicircular arms is provided with diagonal ropes $C^{10}$, secured on bars $C^{11}$, extending from the pivots of the holders C' and $C^2$ on the arm $C^3$, as is plainly shown in Figs. 3, 46, 47, and 48. The bars $C^{11}$ are pivoted on the ends of the arms $C^3$ near the pivots of the holders C' and $C^2$, and the said bars are held in a horizontal position by springs $C^{12}$, secured on the arms $C^3$ and supporting with their free ends the said rope-bars $C^{11}$. (See Fig. 48.) From one of the bars $C^{11}$ extends downward the arm $C^{13}$, adapted to engage a projection $C^{14}$, so as to throw the said bar $C^{11}$ upward suddenly, in order to assist in throwing off the bundle of grain after the band has been tied around it. Each of the semicircular arms $C^8$ or $C^9$ is provided with a forked end composed of two segmental arms $C^{15}$, (see Fig. 49,) pivoted at $C^{16}$ on the respective semicircular arm $C^8$ or $C^9$, and each provided with a lug $C^{17}$, engaged by the free end of a spring $C^{18}$, fastened to the respective semicircular arm $C^8$ or $C^9$. The said springs $C^{18}$ serve to throw the segmental arms $C^{15}$ inward into the position shown in dotted lines in Fig. 49, in order to hold the band for tying the sheaf of grain securely in place. For this purpose the segmental arms $C^{15}$ are provided with notches $C^{19}$, forming a nearly-circular aperture, into which is adapted to pass the band for tying the grain, the said band being thrown against the outer ends of the notches $C^{19}$ with such force as to press the arms $C^{15}$ outward slightly until the band has passed into the aperture formed by the notches $C^{19}$, after which the springs $C^{18}$ force the arms $C^{15}$ inward, whereby the notches $C^{19}$ securely hold the band in place.

During the time the elevator-lifting mechanism R raises a bundle of grain up into the respective holder sufficient grain on the platform F is used for a band to tie the sheaf with. The machine for twisting the grain into a straw band is preferably of the construction shown and described in the application for Letters Patent above referred to. The band-twisting machine H is placed at the rear end of the auxiliary frame D, as is plainly shown in Figs. 38 and 39. A platform H' is secured on the frame D, so that the grain cut by a few innermost knives and passing onto the belts $F^7$ between the roller $F^5$ and the next roller $F^8$ and delivered by the endless belts $F^7$ passes onto the said platform H' during the time the arms R' of the lifting mechanism R of the elevator G are moving upward and downward, as previously described. This part of the grain first passes onto the knife $H^2$, which severs the heads from the stalks, the heads falling into the mouth of a bag X, supported on the under side of the platform H'. The straw is now guided to the set of breaking-rollers $H^4$ by the guide-roller $H^3$, and after leaving the breaking-rollers the straw passes through the casing $H^5$ into the sets of rollers $H^6$, from which the straw band passes into the cone-shaped tube $H^7$, and from the latter to the twisting mechanism $H^8$, which forms the straw into a continuous twisted band $H^{10}$, cut into suitable lengths by a mechanism hereinafter more fully described, and each cut band is carried up into the respective holder C' or $C^2$ of the self-binder C by the band-carrying device I, presently to be described.

The band-twisting machine H is operated by suitable gear-wheels, sprocket-wheels, and sprocket-chains from the shaft $L^7$, which also actuates the cutting mechanism E, as previously described. The shaft $L^7$ receives its motion from the shaft $K^6$, actuated from the main drive-wheel A', as above stated. The carrier I is also operated from the shaft $L^7$, and for this purpose the said shaft is provided with a bevel-pinion I', meshing into a bevel gear-wheel $I^2$, mounted to turn loosely on a fixed sleeve $I^3$, secured on a bracket projecting from the frame D. (See Figs. 40 to 45, inclusive.) Through the sleeve $I^3$ passes centrally a shaft $I^4$, on which is held loosely the carrier-arm $I^5$, engaged by one end of a spring $I^6$, coiled on the shaft $I^4$ within the said sleeve $I^3$ and having its other end secured to the latter. On the outer end of the shaft $I^4$, in front of the carrier-arm $I^5$, is held to slide a rod $I^7$, connected with one end of a spring $I^8$, secured at its other end to a projection extending from the carrier-arm $I^5$. The rod $I^7$ is provided with an angular arm $I^9$, extending past a projection $I^{11}$ on the sleeve $I^3$ and extending onto the hub of the gear-wheel $I^2$, which hub is provided with a cam $I^{10}$, as is plainly illustrated in Figs. 41, 42, and 43. The gear-wheel $I^2$ is rotated in the direction of the arrow shown in Fig. 41, so as to move the carrier-arm $I^5$ slowly downward into a nearly-horizontal position, (shown in Figs. 39 and 40,) thus compressing the spring $I^6$, and when the carrier-arm $I^5$ is released from this lowermost position, as hereinafter more fully described, the arm $I^5$ moves upward very suddenly and quickly by the action of the compressed spring $I^6$, so that the band carried by the arm $I^5$ is thrown into the notches $C^{19}$ in the segmental arms $C^{15}$, (see Fig. 49,) as above described in reference to the said figure.

On the outer end of the arm $I^5$ is arranged a cutting and clamping mechanism U, provided with an arm U', secured on the outer end of the arm $I^5$ and having a projection $U^2$ fitting into a transversely-extending groove $U^3$ of a plate $U^4$, extending rearward from the straw-twisting machine H, and over which passes the continuous band $H^{10}$, formed by the twisting mechanism H. Into this groove $U^3$ also fits a knife $U^5$, held to slide in the under side of the arm U' and connected with a spring $U^6$, secured to the arm U'.

In the knife $U^5$ is arranged a pin $U^7$, on which is mounted loosely a wheel $U^8$, on which is fastened one end of a band $U^9$, passing around the said wheel $U^8$ and connected at its other end with the rod $I^7$, previously mentioned. On the said pin $U^7$ is also mounted to turn a cam $U^{10}$, fastened to the wheel $U^8$, which cam fits in a recess $U^{11}$, formed in the arm U', so that when the said wheel $U^8$ and its cam $U^{10}$ are turned the cam forces the pin $U^7$, with the knife $U^5$, outward toward the lug $U^2$, and the said knife, after the cam is turned back in the recess in the arm U', suddenly moves inward by the force of the spring $U^6$. When the knife $U^5$ moves outward toward the lug $U^2$, as above described, its cutting-edge cuts the band $H^{10}$, which passes over the board $U^4$ and under the arm U' and its lug $U^2$, as is plainly shown in Fig. 45.

When the wheel $I^2$ is rotated from the shaft $L^7$ in the direction indicated by the arrow in Fig. 41, one end of the cam $I^{10}$ on the hub of the said wheel engages the arm $I^9$ of the rod $I^7$, so as to swing the arm $I^5$ slowly downward, at the same time compressing the spring $I^6$. The arm $I^9$, when striking against the lug $I^{11}$, is moved outward by the cam $I^{10}$, thus compressing the spring $I^8$ and permitting a further rotation of the wheel $I^2$ without swinging the arm $I^5$. The latter is then in its lowermost position, with its arm $U'$ in the slot $U^3$ and over the straw band $H^{10}$. The outward movement of the angular arm $I^9$ and the rod $I^7$ pulls on the rope $U^9$, which, pulling on the wheel $U^8$, rotates the cam $U^{10}$, so that the latter moves the knife $U^5$ outward to cut the band $H^{10}$, at the same time clamping the cut-off end of the band onto the lug $U^2$. At this time the angular arm $I^9$ is suddenly dropped at the end of the cam $I^{10}$, whereby the arm $I^5$ becomes free to turn on the shaft $I^4$ and is suddenly forced upward by the compressed spring $I^6$. The straw band held by the arm $I^5$ swings in the same vertical plane in which the curved arms $C^8$ and $C^9$ of the respective holder $C'$ or $C^2$ are located when the latter is in the proper position to receive the band, as shown in Fig. 1. When the arm $I^5$ in its upward motion is suddenly stopped, the straw band swings forward in the same vertical plane, the clamp on the arm $I^5$ being the fulcrum, and the said clamp then being in the position shown in dotted lines in Fig. 39—that is, near the pivot $C^{16}$ of the segmental arm $C^{15}$ of the outer holder-arm $C^8$. The straw band flies into the two sets of segmental arms $C^{15}$ on the arms $C^8$ and $C^9$ with such force as to press the same slightly apart to permit the band ends to pass into the notches $C^{19}$, after which the springs $C^{18}$ close the arm again and the band is held in the said notches and stretched across the holder from one arm $C^8$ to the other arm $C^9$. The notches $C^{19}$ are large enough to permit the band to sag down by its own weight or when grain enters the holder and passes on top of the band between the arms $C^8$ and $C^9$. The band is of a sufficient length to permit such movements without its ends becoming detached from the notches $C^{19}$. The arm $I^5$ is then in the position shown in Fig. 42, and the angular arm $I^9$ now passes suddenly over the rear end of the cam $I^{10}$, whereby the knife $U^5$ is moved inward by the action of the spring $U^6$ to release the band. The arm $I^5$ is then again moved slowly downward by the front end of the cam $I^{10}$ striking against the angular arm $I^9$ of the rod $I^7$ and the above-described operation is repeated.

It is understood that the spring $U^6$ draws the knife $U^5$ back when the arm $I^9$ drops over the shoulder on the cam $I^{10}$ on the arm $I^5$ reaching a vertical position, so as to slacken the rope $U^9$ to permit the wheel $U^8$ and its cam $U^{10}$ to turn on the knife-pin $U^7$, caused by the inward pull of the said spring on the knife.

In order to prevent feeding too much grain to the straw-twisting machine H, a device V is necessary, said device being located at the front end of the auxiliary frame D on the inner side of the cutting mechanism E, as shown more fully in Figs. 34 and 35. This device V is provided with a plate $V'$, held above the platform $H'$ and pivoted to the platform $H'$, previously mentioned. From the pivot end of the plate $V'$ extends downward through a suitable aperture in the platform $H'$ a plate $V^2$, adapted to press against an arm $V^3$, secured on a shaft $V^4$, mounted to turn in a bracket $V^5$, secured to the movable frame $D^2$, also previously mentioned. On the shaft $V^4$, which is arranged vertically, is secured an arm $V^6$, pivotally connected with a bolt $V^7$, held to slide in suitable bearings on the bracket $V^5$ and pivoted at its outer end to a lever $V^8$, carrying a pivot-pin $V^{10}$, engaging a slot $V^{11}$ in an arm $V^9$, fulcrumed at one end to a curved guard $V^{12}$, projecting from the cutting mechanism E on the inner end of the guard-plate $E^7$. The lever $V^8$ is fulcrumed on the guard $V^{12}$ and serves to change the position of the arm $V^9$, which, when open, as shown in Fig. 34, prevents grain from passing between the first guard $E^{10}$ and the end guard $V^{12}$. The pin connecting the lever $V^8$ with the bolt $V^7$ is withdrawn when it is desirable to swing the platform F and cutting mechanism upward to transport the machine from place to place. The arm $V^9$ usually rests over the guard-arm $V^{12}$; but when more grain accumulates on the platform $H'$ than the twisting-machine H needs, then the grain passing onto the platform $H'$ presses the plate $V'$ upward, so that its plate $V^2$ presses against the arm $V^3$, thereby turning the shaft $V^4$, and the latter by its arm $V^6$ moves the sliding bolt $V^7$ outward, whereby the lever $V^8$ moves the arm $V^9$ outward into the position shown in Fig. 34, so that grain cannot pass between the guard-arm $V^{12}$ and the first guard $E^{10}$, but must pass between the first regular guard $E^{10}$. Thus all the grain after it is cut passes to the rear of the roller $F^8$, having the prongs $F^9$ and located next to the roller $F^5$. The grain which thus accumulates in front of the said first roller $F^8$ is all taken up by the rods $R'$ of the grain-lifter R of the elevator G, and no grain passes onto the platform $H'$ until the straw-twisting machine has used up nearly all the grain on the platform $H'$. The grain falling on the platform F in front of the roller $F^8$ is taken up by the next movement of the rods $R'$, as previously described. When the quantity of straw has diminished on the platform $H'$, the plate $V'$ again swings downward, thus releasing the arm $V^3$ by the arm $V^2$, and the arm $V^9$ is now pressed back to its former position over the guard-arm $V^{12}$ by coming in contact with the grain to be cut.

In order to press the grain passing onto the platform $H'$ toward the plate $V'$, the following device is used and actuated from the shaft $L^{10}$. On the front end of the latter is secured a pulley $V^{13}$, over which passes a belt $V^{14}$, also passing over a pulley $V^{15}$, secured on a shaft $V^{16}$, mounted to turn in suitable bearings in the frame D and extending longitudinally under the platform $H'$. Prongs $V^{17}$ are secured on the said shaft, which, when rotated from the shaft $L^{10}$, presses with its prongs $V^{17}$, which extend through an opening in the platform $H'$, the grain toward the plate $V'$. The rotary motion of the first roller $F^8$ is stopped during the time that the grain-lifter of the elevator G moves upward and downward, and the device W for locking said roller $F^8$ is arranged next to the device V, previously described, and it is also shown in Figs. 34, 35, 36, $36^a$, and $36^b$. This locking device W for the roller $F^8$, next to the roller $F^5$, is provided with a pin $W'$, secured on a spring-pressed lever $W^2$, fulcrumed on the frame $F'$ of the platform, and provided with two wedges $W^3$ and $W^4$, adapted to alternately engage inclined surfaces on a latch $W^5$, pivoted on top of the frame $F'$ to swing horizontally, and adapted to engage with a longitudinally-extending pin $W^6$ one of the prongs $F^9$ on one end of the roller $F^8$, so as to lock the latter in place. The pin $W^6$ of the latch $W^5$ is withdrawn from the respective prong $F^9$ of the roller $F^8$ whenever the plate $R^{16}$ presses on the pin $W'$, so that the lever $W^2$ swings, and with its wedge $W^3$ presses on the latch $W^5$, so as to swing the latter outward to disengage the latch from the prong $F^9$ of the roller $F^8$, so that the latter is free to turn. The weight of the plate $R^{16}$ on the pin $W'$ holds the latch $W^5$ disengaged until the said plate swings upward with the lifting-rods $R'$, on which it is secured, and then the spring on the lever $W^2$ presses the latter with its wedge end downward, so that the wedge $W^4$ now acts on the latch $W^5$ and pushes the latter inward, whereby the pin $W^6$ engages the prong $F^9$ and arrests the motion of the roller $F^8$. During the time the roller $F^8$ is stationary its prongs $F^9$ hold the grain carried toward the elevator by the endless bands $F^7$, so that only the grain falling between the guard-arm $V^{12}$ and the first guard $E^{10}$, as previously described, passes onto the platform $H'$ and is used by the straw-twisting machine, as above described. The arm $V^9$ then rests over the guard-arm $V^{12}$, unless moved outward to the position shown in Fig. 34, when too much grain has accumulated for the straw-twisting machine H on the platform $H'$.

It is understood that the grain passing between the guard $V^{12}$ and the first guard $E^{10}$ and cut by the cutting mechanism E is only used for forming the straw band $H^{10}$ during the time the grain-lifter of the elevator G moves upward and downward, and the moment the lifting-arms $R'$ have swung downward and by the plate $R^{16}$ have operated the lever $W^2$ to withdraw the latch $W^5$ then all the grain accumulated by the prongs $F^9$ of the roller $F^8$ is permitted to pass onto the lifting-arms $R'$, with the grain passing between the guard $V^{12}$ and the guard $E^{10}$. When too much grain is on the platform $H'$, the mechanism V throws out the arm $V^9$, so that no grain passes between the guard $V^{12}$ and the first guard $E^{10}$ to the platform $H'$ and to the straw-twisting machine H.

The operation is as follows: When the harvester is drawn forward into the grain in the usual manner in the direction of the arrow $a'$, then the main driving-wheel $A'$ imparts motion to the several devices, as previously described. The cutting mechanism E cuts the grain, which by the reel J is pressed down onto the endless bands $F^7$ of the platform F, and the said bands carry the grain to the lower end of the elevator G, and when sufficient grain has accumulated in a certain time the lifting-arms $R'$ raise the grain upward and deposit the same in the open holder $C'$ or $C^2$ of the self-binder C, the straw band $H^{10}$ being previously placed in the respective holder by the straw-band-carrying mechanism I above described. The grain-holders $C'$ and $C^2$ are moved around in a circle and receive an intermittent motion by means of the master-wheel S, so that one of the holders is forced into the open position shown in Fig. 1 and in line with the straw-band-carrying mechanism I to receive the straw band held by the two sets of segmental arms $C^{15}$ on the arms $C^8$ and $C^9$, the band laying itself according to the shape of the said arms, as shown in Fig. 3. The master-wheel S then imparts motion to the holder, so that the open holder is moved in line with the elevator G, as is plainly shown in Fig. 2, whereby the grain in a bundle is placed into the said holder, as described above, onto the straw band and resting on the ropes $C^{10}$ and the bars $C^{11}$, forming part of the holder-arms $C^8$ and $C^9$, as previously described. The master-wheel S, after the grain is deposited in the holder, again moves the latter, so that the other holder is brought opposite the band-carrying mechanism and in an open position. The holder with the grain has its arms $C^8$ and $C^9$ closed by the action of the circular cams $C^6$ and $C^7$, so that the sets of segmental arms $C^{15}$ form a circle, as is plainly shown in Fig. 1, the ends of the straw band projecting from the notches $C^{19}$. When one holder is in a position to receive the grain from the elevator, the other holder is under the knotting device T, as is plainly shown in Fig. 2, whereby the straw band is formed into a knot, thus binding the sheaf. When the sheaf is bound, the holders move into the next position, in which the holder is opened and the sheaf is thrown out of the holder onto the ground or onto a wagon moving along beside the harvester. The holder then moves into the position shown in Fig. 1 to receive a band again, and the above-described operation is repeated. The fixed cams $C^6$ and $C^7$ (see Figs. 3, 4, 5, 7, and 8) are arranged and constructed in such a manner that when the arm $C^8$ of either holder $C'$ or $C^2$ travels down the incline 1 (see Figs. 5 and 7) the said arm opens outwardly to throw the sheaf off, which takes place soon after the holder has moved away from the knotter T toward the band-carrier I. The other arm $C^9$ of the holder assists at this moment in throwing off the sheaf by passing over the raised part 5 in the cam $C^7$, so that the said arm swings outwardly, thus pushing the sheaf over the previously-opened arm $C^8$. The latter, after the sheaf is thrown off, passes over the raised part 2 of the cam $C^6$ to lift the said arm over the driving-wheel $A'$, after which it again opens fully to be in position to receive the straw band and the grain from the elevator G. At points 3 and 7, which are reached by the arms $C^8$ and $C^9$, respectively, after they are filled with grain by the lifting-rods $R'$ of the elevator G, the said arms again close and remain so until after the knot is formed by the knotter T, and the said arms again reach the points 1 and 5, respectively, and the above-described operation is repeated.

The operator seated on the seat $A^{10}$ can stop the several mechanisms by turning the hand-wheel $K^{23}$, so as to move the clutch mechanism connecting the shaft $K^6$ with the main driving-wheel $A'$ out of gear, as previously described. The operator can raise or lower the frame B, and consequently the frame D, the platform F, and the cutting mechanism E, for cutting the grain farther from or nearer to the ground by turning the hand-wheel $P^3$ and manipulating the treadle $P^7$ to raise or lower the shaft $P^2$, as previously described.

It is understood that the several devices are so timed as to produce the desired result above described. For instance, the length of the cut band made by the straw-twisting machine is somewhat greater than the length of semicircular arms $C^8$ and $C^9$ of the respective holder $C'$ or $C^2$, the said straw band projecting sufficently above the sets of segmental arms $C^{15}$ to form the knot in the manner described in the application above referred to.

When the grain is very short, it is necessary that the platform $F'$ should be shifted rearward, whereby the rods $G^5$ are moved into an angular position, as shown in Fig. 37, and the grain is delivered at the proper place into the holder $C'$ or $C^2$ of the self-binder C, as previously described.

When the machine is to be transported from place to place, the reel J can be folded up, as previously described, and the entire cutting mechanism E, as well as the platform F, is swung upward, turning on the shaft $L^{10}$ as a pivot and leaning against the elevator and part of the knotting device T.

Suitable braces or posts may be employed and secured on the frame B or D to support the platform and the cutting device when in a folded position.

Having thus described my invention, what I claim as new, and desire to secure by Letters Patent, is—

1. In a harvester, the combination, with a self-binder provided with holders each having oppositely-arranged arms, of a band-carrying mechanism provided with an arm adapted to clamp one end of the straw band and mounted to swing the band in the same plane in which the holder-arms are located, a releasing device arranged on the said arm to release the band when the latter is in the said arms, and an elevator to fill the said holders with bundles of grain after the straw bands are in place and released from the carrying-arm by the said releasing device, substantially as shown and described.

2. In a harvester, the combination, with grain-holder arms, each having a pair of yieldingly-mounted segmental arms, of a straw-band-carrying arm mounted to swing to throw the straw band into the said yieldingly-mounted segmental arms, substantially as shown and described.

3. In a harvester, the combination, with a cutting mechanism, of a platform held in the rear of the said cutting mechanism and provided with transverse carrier-belts, a straw-twisting machine into which part of the grain cut by the said cutting mechanism and carried by the said belts is discharged, an elevator onto which the balance of the grain is carried by the said belts, and a self-binder having holders into which the grain carried by the elevator is discharged, substantially as shown and described.

4. In a harvester, the combination, with a cutting mechanism, of a platform held in the rear of the said cutting mechanism and provided with transverse carrier-belts, a straw-twisting machine into which part of the grain cut by the said cutting mechanism and carried by the said belts is discharged, an elevator onto which the balance of the grain is carried by the said belts, a self-binder having holders into which the grain carried by the elevator is discharged, and a band-carrying device for delivering the straw band from the said straw-twisting machine to the said holders, substantially as shown and described.

5. In a harvester, the combination, with a self-binder provided with holders, of a straw-band-carrying device for placing the straw band into the said holders, a band-cutting mechanism held on the said carrying device and serving to cut a continuous straw band into suitable lengths, and a straw-band-twisting machine for forming the straw band and discharging onto the said carrying and cutting devices, substantially as shown and described.

6. In a harvester, the combination, with a main frame, of a second frame held to slide vertically on the said main frame, a self-binder supported on the said second frame, an auxiliary frame secured on the said second frame, and a platform pivoted in the said auxiliary frame and carrying the cutting mechanism, substantially as shown and described.

7. In a harvester, the combination, with a main frame, of a second frame held to slide vertically on the said main frame, a self-binder supported on the said second frame, an auxiliary frame secured on the said second frame and moving with the same, a platform pivoted on the said auxiliary frame, and a cutting mechanism supported on the said platform, substantially as shown and described.

8. In a harvester, the combination, with a main frame, of a second frame held to slide vertically on the said main frame, a self-binder supported on the said second frame, an auxiliary frame secured on the said second frame and moving with the same, a platform pivoted on the said auxiliary frame, a cutting mechanism supported on the said platform, and a sliding frame held to slide in the said auxiliary frame and engaging the said platform to move the latter longitudinally, substantially as shown and described.

9. In a harvester, the combination, with a cutting mechanism, of a platform-frame supporting the said cutting mechanism, a series of endless carrier-belts mounted to travel transversely on the said platform-frame, and a series of rollers over which travel the said belts, and each of which is provided with prongs projecting between successive endless carrier-belts, substantially as shown and described.

10. In a harvester, a reel comprising a hub, radial arms extending from the said hub, and horizontally-extending arms held on the said radial arms and made in sections telescoping one in the other, substantially as shown and described.

11. In a harvester, a reel comprising a hub, radial arms extending from the said hub, horizontally-extending arms held on the said radial arms and made in sections telescoping one in the other, and means, substantially as described, for locking the said telescoping sections in place when extended, as set forth.

12. In a harvester, a reel comprising a hub made in two parts hinged together, radial arms extending from the said hub, horizontal arms extending from the said radial arms, and a locking-plate pivoted on one of the sections of the said hub and engaging the other section to lock both sections in place, substantially as shown and described.

13. In a harvester, the combination, with a platform comprising a platform-frame, endless carrier-belts mounted to travel transversely on the said frame, and a roller over which passes the said belts, and which is provided with prongs projecting between successive belts, of an elevator onto which discharge the said belts, and which is provided with lifting-arms, and a mechanism actuated from the said lifting-arms to lock one of the said rollers having prongs into place or release the same, substantially as shown and described.

14. In a harvester, the combination, with a platform-frame provided on one side with a guideway, of a box mounted to slide in the said guideway and supporting a wheel adapted to travel on the ground, an inclined plate engaging the said box to raise and lower the same in the guideway, and means, substantially as described, for moving the said inclined plate forward and backward, as set forth.

15. In a harvester, the combination, with a platform-frame provided on one side with a guideway, of a box mounted to slide in the said guideway and supporting a wheel adapted to travel on the ground, an inclined plate engaging the said box to raise and lower the same in the guideway, means, substantially as described, for moving the said inclined plate forward and backward, a post pivoted on the said platform-frame and supporting the reel, and a link for connecting the said post with the said inclined plate, as set forth.

16. In a harvester, the combination, with the frame B and an auxiliary frame secured thereto, of a sliding frame mounted to slide on the said auxiliary frame, a shaft mounted to turn in the said auxiliary frame and passing through the said sliding frame, and a platform-frame pivoted on the said shaft and engaged by the said sliding frame, substantially as shown and described.

17. In a harvester, the combination, with the frame B and an auxiliary frame secured thereto, of a sliding frame mounted to slide on the said auxiliary frame, a shaft mounted to turn in the said auxiliary frame and passing through the said sliding frame, a platform-frame pivoted on the said shaft and engaged by the said sliding frame, a series of rollers mounted to turn in the said platform-frame, one of the rollers being held to slide and to turn with the said shaft, and a series of endless belts carried by the said rollers, substantially as shown and described.

18. In a harvester, the combination, with the frame B and an auxiliary frame secured thereto and provided with a longitudinal guideway, of a sliding frame held to slide in the said guideway and provided with rack-teeth, a pinion engaging the said rack-teeth and mounted to turn, a shaft mounted to turn in the said auxiliary frame and passing through the said sliding frame, a platform-frame mounted to swing on the said shaft and engaged by the said sliding frame, a series of rollers mounted to turn in the said platform-frame, one of the said rollers being held to slide upon and to turn with the said shaft, endless carrier-belts passing over the said rollers, a second shaft extending transversely and mounted to turn on the said platform-frame, a gear-wheel held on the said second shaft and in mesh with a rack on the said auxiliary frame, an inclined plate provided with a rack in mesh with a second gear-wheel on the said second shaft, and a box held to slide on the said platform-frame and actuated by the inclined plate, said box carrying a wheel to support the platform above the ground, substantially as shown and described.

19. In a harvester, the combination, with the frame B and an auxiliary frame secured thereto and provided with a longitudinal guideway, of a sliding frame held to slide in the said guideway and provided with rack-teeth, a pinion engaging the said rack-teeth and mounted to turn, a shaft mounted to turn in the said auxiliary frame and passing through the said sliding frame, a platform-frame mounted to swing on the said shaft and engaged by the said sliding frame, a series of rollers mounted to turn in the said platform-frame, one of the said rollers being held to slide upon and to turn with the said shaft, endless carrier-belts passing over the said rollers, a second shaft extending transversely and mounted to turn on the said platform-frame, a gear-wheel held on the said second shaft and in mesh with a rack on the said auxiliary frame, an inclined plate provided with a rack in mesh with a second gear-wheel on the said second shaft, a box held to slide on the said platform-frame and actuated by the inclined plate, said box carrying a wheel to support the platform above the ground, and a reel supported on a post pivoted on the said platform-frame and connected with the said inclined plate, substantially as shown and described.

20. In a harvester, an elevator comprising a series of curved rods having prongs, a spring-pressed shaft mounted to oscillate, lifting-rods pivoted on the said shaft and extending between the said curved rods, a curved arm secured on the said shaft, and a bar mounted to slide and connected with the said curved arm to actuate the latter and the lifting-rods, substantially as shown and described.

21. In a harvester, an elevator comprising a series of curved rods having prongs, a spring-pressed shaft mounted to oscillate, lifting-rods pivoted on the said shaft and extending between the said curved rods, a curved arm secured on the said shaft, a bar mounted to slide and connected with the said curved arm to raise the said lifting-rods, a master-wheel mounted to turn and provided with segmental gear-wheels, and a pinion adapted to be engaged by the said segmental gear-wheels and in mesh with rack-teeth on the said sliding bar to impart motion to the latter, substantially as shown and described.

22. In a harvester, an elevator comprising a series of curved rods having prongs, pivots held on the lower ends of the said rods, a plate connecting with the said rods near their middle, posts supporting the said plate, a slide carrying the said posts, and means, substantially as described, for imparting a longitudinal sliding motion to the said slide, so as to move the said curved rods into an angular position, as set forth.

23. In a harvester, a band-carrying device comprising an arm mounted to swing, a clamping-arm supported at the outer end of the said swinging arm, a spring-pressed knife held to slide on the said clamping-arm to cut a continuous straw band, a projection held on the said knife to clamp in connection with the said clamping-arm the straw band after it has been cut, and mechanism, substantially as described, for imparting an outward sliding motion to the said knife, substantially as shown and described.

24. In a harvester, the combination, with a gear-wheel mounted to turn and provided on its hub with a cam, of a carrying-arm mounted to swing from the center of the said gear-wheel, a rod having an angular arm held to slide on the said carrying-arm, said angular arm being adapted to be engaged by the said cam, a fixed sleeve on which the said gear-wheel turns and which is provided with a projection adapted to be engaged by the said angular arm, a stud held on the said sleeve and forming the pivot for the said carrying-arm, and a spring coiled on the said stud and fastened by one end to the said carrying-arm, substantially as shown and described.

25. In a harvester, the combination, with a gear-wheel mounted to turn and provided on its hub with a cam, of a carrying-arm mounted to swing from the center of the said gear-wheel, a rod having an angular arm held to slide on the said carrying-arm, said angular arm being adapted to be engaged by the said cam, a fixed sleeve on which the said gear-wheel turns, and which is provided with a projection adapted to be engaged by the said angular arm, a stud held on the said sleeve and forming the pivot for the said carrying-arm, a spring coiled on the said stud and fastened by one end to the said carrying-arm, a clamping-arm held on the said carrying-arm, a knife held to slide on the said clamping-arm, and a cam held on the said clamping-arm for actuating the said knife, and which is actuated itself from the rod having an angular arm, substantially as shown and described.

26. In a harvester, a grain-holder comprising pivoted semicircular arms, each having on its free end two segmental pivoted arms, each having a notch near the pivot to receive the straw band, substantially as shown and described.

27. In a harvester, a grain-holder comprising pivoted semicircular arms, each having on its free end two segmental pivoted arms, each having a notch near the pivot to receive the straw band, and springs pressing against the said segmental pivoted arms, substantially as shown and described.

28. In a harvester, a holder comprising two segmental pivoted arms, bars projecting from the pivots of the said arms, and ropes extending from the outer ends of the said bars to the said segmental arms, substantially as shown and described.

29. In a harvester, the combination, with the front roller $F^8$, having prongs $F^9$, of the latch $W^5$, adapted to engage one of the prongs of the said roller to lock the latter in place, and the spring-pressed lever $W^2$, for actuating the said latch, substantially as shown and described.

30. In a harvester, the combination, with the guard-plate $E^7$, having the guards $E^{10}$ and $V^{12}$, of the arm $V^9$, pivoted on the said guard $V^{12}$ and adapted to close the space between the said guard $V^{12}$ and the next guard $E^{10}$, the lever $V^8$, pivoted to the said arm $V^9$ and having its fulcrum on the said guard $V^{12}$, the bolt $V^7$, connected with the said lever $V^8$, and the plate $V'$, controlling the movement of the said bolt $V^7$, substantially as shown and described.

31. In a harvester, the combination, with the guard-plate $E^7$, having the guards $E^{10}$ and $V^{12}$, of the arm $V^9$ pivoted on the said guard $V^{12}$ and adapted to close the space between the said guard $V^{12}$ and the next guard $E^{10}$, the lever $V^8$, pivoted to the said arm $V^9$, and having its fulcrum on the said guard $V^{12}$, the bolt $V^7$, connected with the said lever $V^8$, the plate $V'$, controlling the movement of the said bolt $V^7$, and intermediate mechanism for connecting the said plate $V'$ with the said bolt, substantially as shown and described.

32. In a harvester, the combination, with the frame $D^2$, mounted to slide, of the slide $G^9$, actuated from the said sliding frame $D^2$, posts carried by the said slide $G^9$, rods $G^5$, provided with prongs and supported near their upper ends by the said posts, pivots held in the lower ends of the said rods $D^5$, and a fixed bar $G^2$, in which the said pivots are mounted to turn, substantially as shown and described.

33. In a harvester, the combination, with the frame $D^2$, mounted to slide, of the slide $G^9$, actuated from the said sliding frame $D^2$, posts carried by the said slide $G^9$, rods $G^5$, provided with prongs and supported near their upper ends by the said posts, pivots held in the lower ends of the said rods $D^5$, a fixed bar $G^2$, in which the said pivots are mounted to turn, the shaft $R^2$, mounted to turn and to slide, and the lifting-rods $R'$, pivoted in the said shaft and extending between the said rods $G^5$, substantially as shown and described.

34. In a harvester, the combination, with the grooved board $U^4$, over which passes the straw band, of the arm $U'$, held on a swinging arm and adapted to pass over the straw band on the said board, a lug projecting from the said arm, and a knife mounted to slide on the said arm to cut the said band, substantially as shown and described.

35. In a harvester, the combination, with the grooved board $U^4$, over which passes the straw band, of the arm $U'$, held on a swinging arm and adapted to pass over the straw band on the said board, a lug projecting from the said arm, a knife mounted to slide on the said arm to cut the said band, and a lug held on the said knife and operating in conjunction with the said lug on the arm to clamp the straw band after it is cut by the knife, substantially as shown and described.

36. In a harvester, the combination, with the arm $U'$, of the spring-pressed knife $U^5$, held to slide on the said arm, a pin $U^7$, projecting from the said knife, a wheel mounted to turn on the said pin, and a cam secured on one face of the said wheel and mounted in a recess in the said arm to impart motion to the said knife, substantially as shown and described.

37. In a harvester, the combination, with the roller $F^8$, having prongs near one end, of a latch $W^5$, provided with a pin $W^6$, adapted to engage one of the said prongs, and the spring-pressed lever $W^2$, provided with the wedges $W^3$ and $W^4$, adapted to engage inclined surfaces on the said latch, substantially as shown and described.

38. In a harvester, the combination, with the roller $F^8$, having prongs near one end, of a latch $W^5$, provided with a pin $W^6$, adapted to engage one of the said prongs, the spring-pressed lever $W^2$, provided with the wedges $W^3$ and $W^4$, adapted to engage inclined surfaces on the said latch, and the plate $R^{16}$, having a swinging motion and adapted to engage the free end of the said spring-pressed lever, substantially as shown and described.

HERMAN A. J. RIECKERT.

Witnesses:
   THEO. G. HOSTER,
   C. SEDGWICK.